US010044572B1

(12) United States Patent
Marquardt et al.

(10) Patent No.: US 10,044,572 B1
(45) Date of Patent: *Aug. 7, 2018

(54) DYNAMIC ADDITION OF NETWORK FUNCTION SERVICES

(71) Applicant: Sprint Communications Company L.P., Overland Park, KS (US)

(72) Inventors: Ronald R. Marquardt, Woodinville, WA (US); Lyle W. Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/686,324

(22) Filed: Aug. 25, 2017

Related U.S. Application Data

(63) Continuation of application No. 14/930,146, filed on Nov. 2, 2015, now Pat. No. 9,781,016.

(51) Int. Cl.
*H04L 29/06* (2006.01)
*H04L 12/24* (2006.01)
(Continued)

(52) U.S. Cl.
CPC .......... *H04L 41/5054* (2013.01); *H04L 45/56* (2013.01); *H04L 63/10* (2013.01); *H04L 67/18* (2013.01)

(58) Field of Classification Search
CPC ......... H04L 63/08; H04L 63/10; H04L 63/20; H04L 63/0869; H04L 67/18; H04L 41/5054; H04L 45/56
(Continued)

(56) References Cited

U.S. PATENT DOCUMENTS 5,928,363 A 7/1999 Ruvolo
5,983,350 A 11/1999 Minear et al.
(Continued)

FOREIGN PATENT DOCUMENTS

WO WO2015039699 A1 3/2015
WO WO2016102297 A1 6/2016
WO WO2017062101 A1 4/2017

OTHER PUBLICATIONS

Notice of Allowance dated Oct. 5, 2016, U.S. Appl. No. 14/746,615, filed Jun. 22, 2015.
(Continued)

*Primary Examiner* — Hosuk Song

(57) ABSTRACT

A method of dynamically adding a communication service function to a communication session comprises receiving a communication during a communication session on an active connection, detecting a communication service trigger in the communication, determining a second communication service function based on the communication service trigger, sending a message to a network function virtualization (NFV) catalog, receiving a response from the NFV catalog, providing the routing information to a software defined network (SDN) controller, routing the communication from the first communication service function to the second communication service function, processing the communication with the second communication service function, and routing the communication to an output. The message to the NFV server can include an identity of the second communication service function. The SDN controller can set the session routing protocol to include the second communication service function in a communication flow for the communication session.

20 Claims, 12 Drawing Sheets

(51) Int. Cl.
*H04L 29/08* (2006.01)
*H04L 12/771* (2013.01)

(58) Field of Classification Search
USPC ............ 726/2–3, 11–15; 713/150, 168–170; 709/223–225, 227
See application file for complete search history.

(56) References Cited

U.S. PATENT DOCUMENTS

| | | | |
|---|---|---|---|
| 6,775,772 | B1 | 8/2004 | Binding et al. |
| 7,305,712 | B2 | 12/2007 | Watt et al. |
| 7,325,083 | B2 | 1/2008 | Watt et al. |
| 7,340,573 | B2 | 3/2008 | Wall |
| 7,370,210 | B2 | 5/2008 | Symes |
| 7,661,104 | B2 | 2/2010 | Watt et al. |
| 7,702,951 | B2 | 4/2010 | Yamamoto et al. |
| 7,849,296 | B2 | 12/2010 | Watt et al. |
| 8,090,797 | B2 | 1/2012 | Chinta et al. |
| 8,171,483 | B2 | 5/2012 | Nord et al. |
| 8,271,976 | B2 | 9/2012 | Vega et al. |
| 8,280,944 | B2 | 10/2012 | Laadan et al. |
| 8,443,230 | B1 | 5/2013 | James-Roxby et al. |
| 8,712,407 | B1 | 4/2014 | Cope et al. |
| 8,797,875 | B2 | 8/2014 | Garcia Martin et al. |
| 8,842,578 | B1 | 9/2014 | Zisapel et al. |
| 8,863,252 | B1 | 10/2014 | Katzer et al. |
| 8,918,860 | B1 | 12/2014 | Enderwick |
| 8,935,318 | B1 | 1/2015 | Konerding et al. |
| 8,984,110 | B1 | 3/2015 | Asveren |
| 8,996,644 | B2 | 3/2015 | Pope |
| 9,047,441 | B2 | 6/2015 | Xie et al. |
| 9,077,709 | B1 | 7/2015 | Dall et al. |
| 9,104,836 | B2 | 8/2015 | Burstein et al. |
| 9,118,655 | B1 | 8/2015 | Paczkowski et al. |
| 9,161,227 | B1 | 10/2015 | Bye et al. |
| 9,183,606 | B1 | 11/2015 | Paczkowski et al. |
| 9,191,865 | B1 | 11/2015 | Paczkowski et al. |
| 9,203,842 | B2 | 12/2015 | Venkataramu et al. |
| 9,230,085 | B1 | 1/2016 | Paczkowski et al. |
| 9,237,084 | B2 | 1/2016 | Chapman |
| 9,251,384 | B1 | 2/2016 | Potlapally et al. |
| 9,274,974 | B1 | 3/2016 | Chen et al. |
| 9,282,898 | B2 | 3/2016 | McRoberts et al. |
| 9,288,148 | B1 | 3/2016 | Krishnaswamy et al. |
| 9,298,515 | B2 | 3/2016 | McMurry et al. |
| 9,317,689 | B2 | 4/2016 | Aissi |
| 9,319,220 | B2 | 4/2016 | Grewal et al. |
| 9,324,016 | B1 | 4/2016 | Cordes et al. |
| 9,384,028 | B1 | 7/2016 | Felstaine et al. |
| 9,392,446 | B1 | 7/2016 | Paczkowski et al. |
| 9,407,612 | B2 | 8/2016 | Sood et al. |
| 9,413,634 | B2 * | 8/2016 | Nadeau ............... H04L 45/124 |
| 9,444,886 | B2 * | 9/2016 | Rahman ............. H04L 67/1012 |
| 9,450,866 | B2 | 9/2016 | He et al. |
| 9,460,286 | B1 | 10/2016 | Felstaine et al. |
| 9,462,084 | B2 * | 10/2016 | Connor ............... G06F 9/45558 |
| 9,503,344 | B2 * | 11/2016 | Chakrabarti ........ H04L 43/0852 |
| 9,503,363 | B2 | 11/2016 | Sivabalan et al. |
| 9,509,587 | B1 | 11/2016 | Marquardt et al. |
| 9,519,563 | B2 | 12/2016 | Manghirmalani et al. |
| 9,537,741 | B2 | 1/2017 | Chakrabarti et al. |
| 9,549,321 | B2 | 1/2017 | Slavov et al. |
| 9,560,078 | B2 * | 1/2017 | Sood ....................... H04L 63/20 |
| 9,565,168 | B1 | 2/2017 | Marquardt et al. |
| 9,578,008 | B2 | 2/2017 | Sood et al. |
| 9,578,664 | B1 | 2/2017 | Paczkowski et al. |
| 9,613,190 | B2 | 4/2017 | Ford et al. |
| 9,628,445 | B2 | 4/2017 | Antonakakis |
| 9,648,044 | B2 | 5/2017 | Islam et al. |
| 9,667,665 | B1 | 5/2017 | Paczkowski et al. |
| 9,686,237 | B2 | 6/2017 | DeCusatis et al. |
| 9,686,240 | B1 | 6/2017 | Ray et al. |
| 9,692,743 | B2 | 6/2017 | Islam et al. |
| 9,729,515 | B1 | 8/2017 | Anantharaju |
| 9,742,790 | B2 | 8/2017 | Sood et al. |
| 9,749,294 | B1 | 8/2017 | Marquardt et al. |
| 9,769,854 | B1 | 9/2017 | Paczkowski et al. |
| 9,781,016 | B1 | 10/2017 | Marquardt et al. |
| 9,811,686 | B1 | 11/2017 | Marquardt et al. |
| 9,819,661 | B2 | 11/2017 | Stern |
| 9,871,768 | B1 | 1/2018 | Ray et al. |
| 9,979,699 | B1 | 5/2018 | Marquardt et al. |
| 2002/0091650 | A1 | 7/2002 | Ellis |
| 2002/0107958 | A1 | 8/2002 | Faraldo |
| 2003/0177387 | A1 | 9/2003 | Osterwalder et al. |
| 2004/0139352 | A1 | 7/2004 | Shewchuk et al. |
| 2004/0177269 | A1 | 9/2004 | Belnet et al. |
| 2004/0181682 | A1 | 9/2004 | Orino et al. |
| 2004/0187117 | A1 | 9/2004 | Orion et al. |
| 2004/0240468 | A1 | 12/2004 | Chin et al. |
| 2004/0260910 | A1 | 12/2004 | Watt et al. |
| 2005/0068981 | A1 | 3/2005 | Park et al. |
| 2005/0102603 | A1 | 5/2005 | Tapper et al. |
| 2005/0114616 | A1 | 5/2005 | Tune et al. |
| 2005/0138421 | A1 | 6/2005 | Fedronic et al. |
| 2005/0160210 | A1 | 7/2005 | Watt et al. |
| 2005/0185672 | A1 | 8/2005 | Endo et al. |
| 2005/0261985 | A1 | 11/2005 | Miller et al. |
| 2006/0146767 | A1 | 7/2006 | Moganti |
| 2006/0190614 | A1 | 8/2006 | Altman et al. |
| 2006/0253701 | A1 | 11/2006 | Kim et al. |
| 2006/0259641 | A1 | 11/2006 | Kim et al. |
| 2007/0174253 | A1 | 7/2007 | Hodnett et al. |
| 2007/0282572 | A1 | 12/2007 | Larus |
| 2008/0020745 | A1 | 1/2008 | Bae et al. |
| 2008/0162877 | A1 | 7/2008 | Altman et al. |
| 2008/0165259 | A1 | 7/2008 | Nobels |
| 2008/0189468 | A1 | 8/2008 | Schmidt et al. |
| 2008/0301779 | A1 | 12/2008 | Garg et al. |
| 2009/0007100 | A1 | 1/2009 | Field et al. |
| 2009/0199177 | A1 | 8/2009 | Edwards et al. |
| 2009/0210526 | A1 | 8/2009 | Howell et al. |
| 2009/0241108 | A1 | 9/2009 | Edwards et al. |
| 2009/0254984 | A1 | 10/2009 | Nice et al. |
| 2009/0300605 | A1 | 12/2009 | Edwards et al. |
| 2009/0320048 | A1 | 12/2009 | Watt et al. |
| 2010/0103837 | A1 | 4/2010 | Jungck et al. |
| 2010/0106568 | A1 | 4/2010 | Grimes |
| 2010/0192230 | A1 | 7/2010 | Steeves et al. |
| 2011/0119748 | A1 | 5/2011 | Edwards et al. |
| 2011/0173443 | A1 | 7/2011 | Osterwalder et al. |
| 2012/0040662 | A1 | 2/2012 | Rahman et al. |
| 2012/0117379 | A1 | 5/2012 | Thornewell et al. |
| 2012/0304244 | A1 | 11/2012 | Xie et al. |
| 2012/0331550 | A1 | 12/2012 | Raj et al. |
| 2013/0055256 | A1 | 2/2013 | Banga et al. |
| 2013/0070745 | A1 | 3/2013 | Nixon et al. |
| 2013/0091568 | A1 | 4/2013 | Sharif et al. |
| 2013/0160139 | A1 | 6/2013 | Goel et al. |
| 2013/0290563 | A1 | 10/2013 | Fleischman et al. |
| 2013/0305333 | A1 | 11/2013 | Katzer et al. |
| 2013/0333008 | A1 | 12/2013 | Tapling et al. |
| 2013/0345530 | A1 | 12/2013 | McRoberts et al. |
| 2014/0013327 | A1 | 1/2014 | Sherwood et al. |
| 2014/0033316 | A1 | 1/2014 | Paczkowski et al. |
| 2014/0047548 | A1 | 2/2014 | Bye et al. |
| 2014/0052922 | A1 | 2/2014 | Moyer et al. |
| 2014/0053003 | A1 | 2/2014 | Moyer et al. |
| 2014/0075567 | A1 | 3/2014 | Raleigh et al. |
| 2014/0201374 | A1 | 7/2014 | Ashwood-Smith et al. |
| 2014/0229945 | A1 | 8/2014 | Barkai et al. |
| 2014/0241247 | A1 | 8/2014 | Kempf et al. |
| 2014/0259115 | A1 | 9/2014 | Bakshi et al. |
| 2014/0281529 | A1 | 9/2014 | Epp et al. |
| 2014/0281544 | A1 | 9/2014 | Paczkowski et al. |
| 2014/0289826 | A1 | 9/2014 | Croome |
| 2014/0298477 | A1 | 10/2014 | Castro et al. |
| 2014/0304803 | A1 | 10/2014 | Pope et al. |
| 2014/0325681 | A1 | 10/2014 | Kleidermacher et al. |
| 2014/0331297 | A1 | 11/2014 | Innes et al. |
| 2014/0337940 | A1 | 11/2014 | Slavov et al. |
| 2014/0344912 | A1 | 11/2014 | Chapman et al. |
| 2014/0373012 | A1 | 12/2014 | Ylitalo et al. |
| 2015/0046676 | A1 | 2/2015 | Archibald et al. |

(56) References Cited

U.S. PATENT DOCUMENTS

| | | |
|---|---|---|
| 2015/0072726 A1 | 3/2015 | Stern |
| 2015/0074745 A1 | 3/2015 | Stern et al. |
| 2015/0074764 A1 | 3/2015 | Stern |
| 2015/0089246 A1 | 3/2015 | Kanai et al. |
| 2015/0117409 A1 | 4/2015 | Ghai |
| 2015/0117455 A1 | 4/2015 | Umesh et al. |
| 2015/0169885 A1 | 6/2015 | Paczkowski et al. |
| 2015/0172928 A1 | 6/2015 | Katzer et al. |
| 2015/0180730 A1 | 6/2015 | Felstaine et al. |
| 2015/0195281 A1 | 7/2015 | Venkataramu et al. |
| 2015/0215308 A1 | 7/2015 | Manolov et al. |
| 2015/0220937 A1 | 8/2015 | Iannace et al. |
| 2015/0237035 A1 | 8/2015 | Islam et al. |
| 2015/0244717 A1 | 8/2015 | Jin et al. |
| 2015/0248283 A1 | 9/2015 | Gschwind et al. |
| 2015/0248554 A1 | 9/2015 | Dumitru et al. |
| 2015/0358248 A1 | 12/2015 | Saha et al. |
| 2015/0365352 A1 | 12/2015 | Xiang |
| 2015/0370704 A1 | 12/2015 | Kato |
| 2015/0373050 A1 | 12/2015 | Dayan et al. |
| 2015/0381423 A1 | 12/2015 | Xiang |
| 2016/0004876 A1 | 1/2016 | Bye et al. |
| 2016/0007190 A1 | 1/2016 | Wane |
| 2016/0043944 A1 | 2/2016 | Felstaine et al. |
| 2016/0057102 A1 | 2/2016 | Wei et al. |
| 2016/0057171 A1 | 2/2016 | DeCusatis et al. |
| 2016/0057788 A1 | 2/2016 | Sharma et al. |
| 2016/0073283 A1 | 3/2016 | Grayson et al. |
| 2016/0080323 A1 | 3/2016 | MacKay et al. |
| 2016/0086172 A1 | 3/2016 | Kamal et al. |
| 2016/0094573 A1 | 3/2016 | Sood et al. |
| 2016/0119141 A1 | 4/2016 | Jing et al. |
| 2016/0119374 A1 | 4/2016 | Williams et al. |
| 2016/0127323 A1 | 5/2016 | Antonakakis |
| 2016/0127333 A1 | 5/2016 | Sood et al. |
| 2016/0149748 A1 | 5/2016 | Pan |
| 2016/0149921 A1 | 5/2016 | Potlapally et al. |
| 2016/0157084 A1 | 6/2016 | Tsubouchi |
| 2016/0170848 A1 | 6/2016 | Yang et al. |
| 2016/0180089 A1 | 6/2016 | Dalcher |
| 2016/0182499 A1 | 6/2016 | Sharaga et al. |
| 2016/0182567 A1 | 6/2016 | Sood et al. |
| 2016/0205004 A1 | 7/2016 | Chou et al. |
| 2016/0212016 A1 | 7/2016 | Vrzic et al. |
| 2016/0212620 A1 | 7/2016 | Paczkowski et al. |
| 2016/0219076 A1 | 7/2016 | Paczkowski et al. |
| 2016/0226663 A1 | 8/2016 | Jones et al. |
| 2016/0226907 A1 | 8/2016 | Weiss et al. |
| 2016/0226912 A1 | 8/2016 | Clark et al. |
| 2016/0226913 A1 | 8/2016 | Sood et al. |
| 2016/0253664 A1 | 9/2016 | Yuan et al. |
| 2016/0323200 A1 | 11/2016 | Xiang et al. |
| 2016/0337329 A1 | 11/2016 | Sood et al. |
| 2016/0344560 A1 | 11/2016 | Caceres et al. |
| 2016/0350150 A1 | 12/2016 | Marquardt et al. |
| 2016/0352537 A1 | 12/2016 | Marquardt et al. |
| 2016/0366105 A1 | 12/2016 | Smith et al. |
| 2016/0366123 A1 | 12/2016 | Smith et al. |
| 2016/0373474 A1 | 12/2016 | Sood et al. |
| 2016/0378685 A1 | 12/2016 | Spurlock et al. |
| 2016/0379003 A1 | 12/2016 | Kapoor et al. |
| 2017/0005990 A1 | 1/2017 | Birger et al. |
| 2017/0012968 A1 | 1/2017 | Feng et al. |
| 2017/0012975 A1 | 1/2017 | Ilyadis et al. |
| 2017/0034284 A1 | 2/2017 | Smith et al. |
| 2017/0068817 A1 | 3/2017 | Ali et al. |
| 2017/0093806 A1 | 3/2017 | Phegade et al. |
| 2017/0102957 A1 | 4/2017 | Marquardt et al. |
| 2017/0126413 A1 | 5/2017 | Grobman et al. |
| 2017/0142024 A1 | 5/2017 | Fromentoux et al. |
| 2017/0142163 A1 | 5/2017 | Sood et al. |
| 2017/0149798 A1 | 5/2017 | Antonakakis |
| 2017/0161501 A1 | 6/2017 | Sood et al. |
| 2017/0187723 A1 | 6/2017 | Islam et al. |
| 2017/0208038 A1 | 7/2017 | Hinaman et al. |
| 2017/0214694 A1 | 7/2017 | Yan |
| 2017/0230428 A1 | 8/2017 | Paczkowski et al. |
| 2017/0310647 A1 | 10/2017 | Hu et al. |

OTHER PUBLICATIONS

Notice of Allowance dated May 12, 2017, U.S. Appl. No. 15/403,166, filed Jan. 10, 2017.

FAIPP Pre-Interview Communication dated Jul. 25, 2016, U.S. Appl. No. 14/703,885, filed May 5, 2015.

Notice of Allowance dated Sep. 20, 2016, U.S. Appl. No. 14/703,885, filed May 5, 2015.

FAIPP Pre-Interview Communication dated Feb. 7, 2017, U.S. Appl. No. 14/847,992, filed Sep. 8, 2015.

Notice of Allowance dated Apr. 25, 2017, U.S. Appl. No. 14/847,992, filed Sep. 8, 2015.

FAIPP Pre-Interview Communication dated Mar. 9, 2017, U.S. Appl. No. 14/930,146, filed Nov. 2, 2015.

Notice of Allowance dated May 26, 2017, U.S. Appl. No. 14/930,146, filed Nov. 2, 2015.

FAIPP Pre-Interview Communication dated Apr. 20, 2017, U.S. Appl. No. 14/879,324, filed Oct. 9, 2015.

Notice of Allowance dated Jul. 3, 2017, U.S. Appl. No. 14/879,324, filed Oct. 9, 2015.

FAIPP Pre-Interview Communication dated Oct. 19, 2017, U.S. Appl. No. 14/872,936, filed Oct. 1, 2015.

Office Action dated Jul. 24, 2017, U.S. Appl. No. 14/879,327, filed Oct. 9, 2015.

Notice of Allowance dated Nov. 21, 2016, U.S. Appl. No. 14/793,344, filed Jul. 7, 2015.

Notice of Allowance dated Sep. 11, 2017, U.S. Appl. No. 15/602,057, filed May 22, 2017.

Network Functions Virtualisation, "An Introduction, Benefits, Enablers, Challenges & Call for Action," Oct. 22-24, 2012, "SDN an OpenFlow World Congress," Darmstadt-Germany.

Network Functions Virtualisation, "Network Operator Perspectives on Industry Progress," Oct. 14-17, 2012, "SDN an OpenFlow World Congress," Darmstadt-Germany.

Foreign Communication from a Related Counterpart—International Search Report and Written Opinion dated Oct. 21, 2016, filed on Aug. 11, 2016, International Application No. PCT/US2016/046648.

Hwang, Jinho, et al., entitled, "NetVM: High Performance and Flexible Networking Using Virtualization on Commodity Platforms," 11th USENIX Symposium on Networked Systems Design and Implementation (NSDI '14); Apr. 2-5, 2014, Seattle WA, US, ISBN 978-1-931971-09-06.

Marquardt, Ronald R., et al., "System and Method of Establishing Trusted Operability Between Networks in a Network Functions Virtualization Environment," filed Jul. 20, 2017, U.S. Appl. No. 15/655,080.

Marquardt, Ronald R., et al., "Support Systems Interactions with Virtual Network Functions in a Trusted Security Zone," filed Oct. 9, 2015, U.S. Appl. No. 14/879,324.

Marquardt, Ronald R., et al., "Securing Communication in a Network Function Virtualization (NFV) Core Network," filed Oct. 1, 2015, U.S. Appl. No. 14/872,936.

Ray, Amar N., et al., "IPv6 to IPv4 Data Packet Migration in a Trusted Security Zone," filed May 22, 2017, U.S. Appl. No. 15/602,057.

Bales, Mark R., et al., "Session Aggregator Brokering of Data Stream Communication," filed Oct. 3, 2016, U.S. Appl. No. 15/284,506.

FAIPP Pre-Interview Communication dated Dec. 15, 2017, U.S. Appl. No. 15/655,080, filed Jul. 20, 2017.

Notice of Allowance dated Jan. 30, 2018, U.S. Appl. No. 15/655,080, filed Jul. 20, 2017.

Final Office Action dated Feb. 7, 2018, U.S. Appl. No. 14/879,327, filed Oct. 9, 2015.

Paczkowski, Lyle W., et al., "Tiered Distributed Ledger Technology (DLT) in a Network Function Virtualization (NFV) Core Network," filed Aug. 25, 2017, U.S. Appl. No. 15/686,312.

(56) References Cited

OTHER PUBLICATIONS

Final Office Action dated Apr. 17, 2018, U.S. Appl. No. 14/872,936, filed Oct. 1, 2015.
Foreign Communication from a Related Counterpart, Preliminary Report on Patentability, dated Apr. 19, 2018, Application No. PCT/US2016/046648, filed on Aug. 11, 2016.

* cited by examiner

DYNAMIC ADDITION OF NETWORK FUNCTION SERVICES

CROSS-REFERENCE TO RELATED APPLICATIONS

This application claims priority as a continuation application to U.S. patent application Ser. No. 14/930,146 filed on Nov. 2, 2015, entitled "Dynamic Addition of Network Function Services" by Ronald R. Marquardt, et al., which is herein incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic communications can use a variety of functions. When a subscriber requests a specific set of services (e.g., referred to as a service plan), a wireless provider may configure the services into a connection path for the subscriber. This may allow the subscriber to access the services they have subscribed to during the use of their services. Additional services can be added upon request, which generally requires configuring the services into a processing flow within the wireless service provider prior to the subscriber being able to use the services.

SUMMARY

In an embodiment, a method of dynamically adding a communication service function using network function virtualization during a communication session comprises receiving, at a first communication service function executing on a server, a communication during a communication session on an active connection, detecting, by the first communication service function, a communication service trigger in the communication, determining a second communication service function based on the communication service trigger, and sending, by the first communication service function, a message to a network function virtualization catalog. The message comprises an identity of the second communication service function. The method also comprises receiving, by the first communication service function, a response from the network function virtualization catalog. The response comprises an operating location and routing information for the second communication service function. The method further includes providing, by the first communication service function, the routing information to a software defined network controller. The software defined network controller sets the session routing protocol, and can update the session routing protocol to include the second communication service function in a communication flow for the communication session. The method also comprises routing the communication from the first communication service function to the second communication service function, processing the communication with the second communication service function, and routing the communication to an output.

In an embodiment, a method of dynamically adding a communication service function to an active connection comprises performing a communication session over an active connection. A session routing protocol defines a communication path through a first communication service function executing on a server. The method also comprises receiving, at the first communication service function, a communication during the communication session, detecting, by the first communication service function, a communication service trigger in the communication, determining a second communication service function based on the communication service trigger, and sending, by the first communication service function, a message to a network function virtualization catalog. The message comprises an identity of the second communication service function. The method also comprises receiving, by the first communication service function, a reply from the network function virtualization catalog that indicates that the second communication service function is unavailable, instantiating, by a software defined network controller, the second communication service function on a server, receiving, by the first communication service function, a notification of the instantiation of the second communication service function and routing information for the second communication service function, and providing, by the first communication service function, the routing information to the software defined network controller. The software defined network controller defines a session routing protocol to include the second communication service function in a communication flow for the communication session. The method also includes routing the communication from the first communication service function to the second communication service function, processing the communication with the second communication service function, and routing the communication to an output.

In an embodiment, a method of dynamically adding a communication service function to a trusted connection comprises receiving, at a first communication service function executing on a server, a communication during a trusted communication session on a trusted connection, detecting, by the first communication service function, a communication service trigger in the communication, determining a second communication service function based on the communication service trigger, sending, by the first communication service function, a message to a trusted network function virtualization catalog that comprises an identity of the second communication service function and an operating location of the first communication service function, receiving, by the first communication service function, a response from the trusted network function virtualization catalog that comprises an operating location and routing information for the second communication service function. The operating location of the second communication service function can be the same as the operating location of the first communication service function. The method also comprises providing, by the first communication service function, the routing information to a software defined network controller, routing the communication from the first communication service function to the second communication service function, processing the communication with the second communication service function, and routing the communication to an output. The software defined network controller sets the session routing protocol to include the second communication service function in a communication flow for the communication session.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
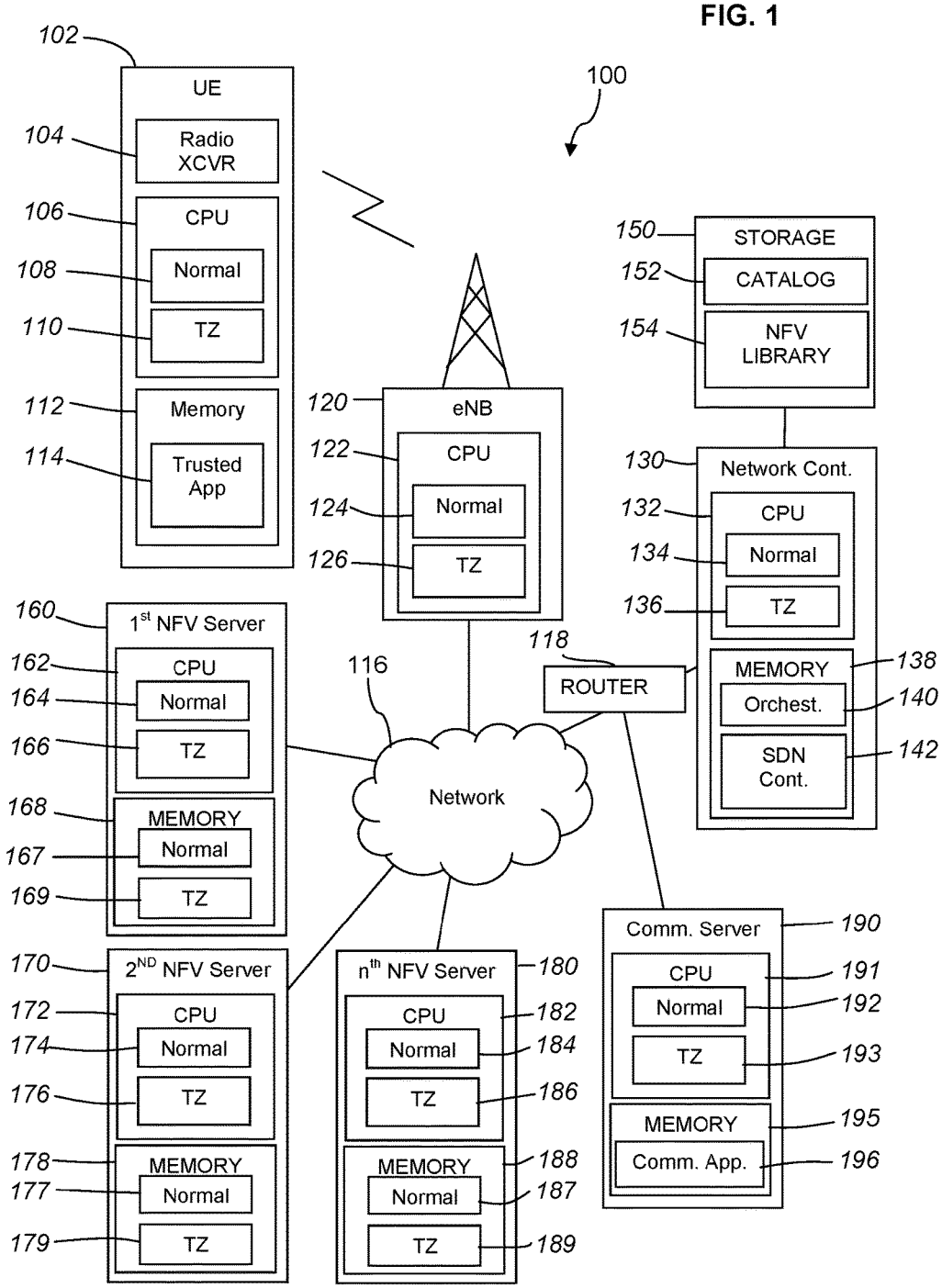
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Disclosed herein are systems and methods for implementing various subscriber services using network function virtualization (NFV) and dynamically chaining the NFV functions during a communication session. The use of NFV may allow for the functions to be instantiated during a communication session rather than having to be created in hardware prior to a connection being formed. For example, a user may call a third party. If the user has subscribed to various services such as conference calling or video streaming, a pre-configured connection can be formed that can handle the use of these features during the call with the third party. However, if a user has not subscribed to these features, a user may not be able to use these features during the call with the third party due to the lack of the pre-configured connections.

NFV functions can be dynamically instantiated and chained into an active communication session. In an embodiment, NFV can be used to provide a communication service function that can be dynamically chained during a communication session. An NFV catalog of the NFV functions can be implemented to maintain a list of all active NFV functions, their assignments to one or more communication sessions, and the relevant routing information for accessing them. The catalog can also be used to provide available resource locations for instantiating an NFV function if a requested NFV function is not available during a communication session. The NFV catalog may allow for NFV functions to be dynamically located as needed during a communication session. In order to include an NFV function in a communication session, a software defined network (SDN) controller can be used to redefine a routing protocol for a communication session to include the requested NFV functions into the routing for the communication session. This may allow for the communications to be processed as desired during the communication session.

As an example, a user calling a third party may use a first communication service function including a voice calling service. The voice calling service itself can be provided by an NFV function that is selected during a setup procedure for the call. During the call, a user may desire to use a conference calling feature, which may not be part of a current configuration for the user's service. Since the conference calling feature may not be part of the service plan, a pre-configured connection between the user's equipment and a conference calling server may not exist. Rather than having the user hang up, request the conference calling feature, and then reconnecting to the third party, the system may detect the request for the conference calling feature, identify the conference calling feature as being requested, and use the NFV catalog to locate an available conference all function for use with the call. The SDN controller can then update the communication session routing protocol to include the conference calling feature during the communication session. This process may be seamless to the end user, which may allow for a wide variety of services to be dynamically added to a communication session on the fly.

In some instance, an NFV function may not be available when requested. For example, the NFV catalog may indicate that all of the executing NFV functions of a particular type are assigned to other communication sessions or there are not currently executing instances of the requested NFV function. In this situation, the NFV catalog can provide the information for an available resource. An NFV library can store the NFV function definitions, which can then be used to instantiate the NFV function at an available resource. Once instantiated, the NFV function can be included in the routing protocol and used during the communication session. This type of dynamic creation and addition of the NFV function may provide for fast and simple scaling of the subscriber services.

The present systems and methods can also be used in a trusted environment such as a trusted security zone. In general, a trusted environment includes the use of a hardware or software assisted trust. The trusted environment may prevent or limit access to a trusted application by untrusted applications. For example, the execution of an application in a trust zone may prevent all other applications outside of the trust zone from executing. This execution scenario may make it difficult to dynamically add NFV functions to a communication session. First, the NFV catalog may be accessed in trust, which would prevent other communication sessions from accessing the NFV catalog until it is released.

In order to allow the NFV catalog to be used by more than one trusted communication session, a semaphore can be used along with a synchronization process to allow multiple versions of the NFV catalog to operate in multiple trusted environments while maintaining any changes made during the operation in the trusted environment. In this context the semaphore is used to provide access to the NFV catalog to multiple communication sessions while one or more of the communication sessions are accessing the NFV catalog in a trusted environment.

In addition to the NFV catalog, the execution of multiple communication services using NFV functions in different locations may be a challenge. In some embodiments, an end-to-end trusted connection can be established between the user and output that can include one or more NFV functions. However, the execution of each NFV function in different locations may require serial execution and handling of a communication. For example, a communication or packet may be processed by a first communication service function in trust, which would be completed and released prior passing the processed communication to a second communication service function. When the communication service functions interoperate or concurrently operate, the communication service functions can be executed in the same location (e.g., on the same processor or processor group) to allow the two or more communication service functions to concurrently operate. The trusted NFV catalog can be used to locate a requested NFV function at the location of one or more operating NFV functions so that the NFV functions for a communication session can operate in a trusted environment at the same time. Thus, the present system may be used with both trusted and untrusted environments.

In an embodiment, some of a communication network's functionality may be provided with an NFV communication paradigm. For example, the functionality of subscriber services such as voice and data services as provided by a home subscriber server, a mobility management entity, a policy and charging rules function node, and a serving gateway—rather than each being provided by separate computers or computer systems—may be provided by virtual servers executing in a virtual computing environment, for example executing in a cloud computing environment.

In this context, specific functions can be stored in one or more network accessible memories. When a specific function is needed, the function is located and a copy can be loaded and instantiated on an available computing resource. In general, the cloud computing environment allows for the available resources to be geographically dispersed, but the resources are connected by an available network connection. The resources themselves represent physical computing environments. For example, a server having one or more server blades, each with one or more processors, memories, or the like. From an NFV viewpoint, each server blade or individual computing resource can be used to instantiate an NFV function. In general, a facility may comprise numerous servers, each of which can be used to execute one or more functions, and any number of facilities can be accessed over the network connection.

The reference to an NFV functions generally refers to the instantiation of the function in a software environment rather than a hardware environment. In general, most functions are current performed in dedicated hardware computers. For example, a voice-mail function is generally performed by a voice-mail server that is configured to only provide voice-mail functionalities. The voice-mail server may be capable of handling a maximum number of concurrent processing requests for the voice mail function. If this number is exceeded, the requests are delayed or denied. Thus, scaling is somewhat limited to including new, physical servers for a desired function.

In addition, a combination of network functionalities are generally pre-wired or pre-routed for specific services. For example, if a customer requests both voice-mail and conference calling services for a specific service plan, a connection is formed for that customer as part of the service set-up process. The customer may then be able to access the two services which can be directed to dedicated resources. For example, a limited number of voice-mail services can be directed to a given voice-mail server to reduce the likelihood that the voice-mail server can be overloaded.

The use of NFV may allow for the dynamic instantiation of network functions, and thereby allow for faster scaling. Many of the current network functions can be virtualized in a network environment. For example, the network functions may be composed of common functions. For example, a mobility management entity network function may be composed of a network attach function, an authentication function, a mobility function, a context function, and other functions. A home subscriber server network function may be composed of the attach function and the authentication function. In an embodiment, common functions are executed in one or more virtual servers executing in a virtual computing environment. Then when a first network function is performed, the sequence of operations associated with the first network function are performed by the several engaged common network functions executing in different virtual servers. And when a different second network function is performed, the sequence of operations associated with the second network function is performed, in part, by one of the common network functions used by the first network function. The common function processing may be performed by the same virtual server instance that handles the processing of the common function for the first network function. This may be referred to as factorizing the common functions.

In addition to the network functions, various additional functions such as voice functions and data session management functions can be virtualized. Functions typical to subscription services such as a voicemail function, a video optimization function, a parental control function, a video conferencing function, or a voice conferencing function can also be virtualized. The virtualization of these types of functions may avoid the need for dedicated modules that can be difficult to scale up for a customer base.

The factorization of common functions in combination with virtualized execution can provide a variety of advantages to a wireless communication service provider. This paradigm provides the ability to conveniently and quickly expand or contract computing resources as needed. This paradigm allows a wireless communication service provider to pay for computing resources as they are used, on an as needed basis, versus investing significant capital in purchasing and installing computing equipment in anticipation of future needs, needs which may not materialize or may not be as large (or as small!) as projected. Virtualization of common network functions and network function virtualization is described further hereinafter.

Virtual servers execute on computing resources. The physical details of the computing resources may be abstracted so a virtual server only interacts with a logical view of the underlying computing resources, thereby decoupling the virtual servers from the physical details of the computing resources. Decoupling the virtual servers from the physical details of the underlying computing resources may make instantiating the virtual server on different physical computing resources more convenient and may entail less system administrator intervention. A virtual server may execute in the context of or under the management of a hypervisor or a container management system that abstracts away the physical details of the underlying computing resources. Computing resources comprise the customary computer or computing system components: processors, main memory (e.g., semiconductor RAM), secondary storage or mass memory (e.g., disk drives), and network interfaces. Computing resources may also comprise trusted security zone resources.

Turning now to FIG. 1, a communication system 100 is described. In an embodiment, the system 100 comprises a user equipment (UE) 102 coupled to one or more servers 130, 160, 170, 180 through a network 116. A network controller server 130 may be in communication with a data store 150, and the servers 160, 170, 180 using one or more network routing elements present in the network 116. While illustrated as a single element in FIG. 1, it should be understood that any number of elements can be used to route network communications between the servers 130, 160, 170, 180, the communication server 190, the data storage 150 and/or the network 116.

In some contexts, the UE 102 may be referred to as a mobile telecommunications device, a mobile electronic device, or a mobile communication device. The UE 102 may comprise a radio transceiver 104, a processor 106, and a memory 112. The processor 106 can comprise a normal partition 108 and a trusted partition 110. The memory 112 may comprise a trusted application 114. The UE 102 may be configured to establish a wireless or wired communication link with a network 116 through an enhanced node B 120. The enhanced node B 120 can comprise a processor 122 having a normal partition 124 and a trusted partition 126 to enable the enhanced node B 120 to form normal connections and trusted connections as desired. The network 116 may comprise any combination of private and public networks. In some embodiments, the role played by the enhanced node B 120 in FIG. 1 and this description may be filled by a base transceiver station (BTS) or by a cellular tower.

It is understood that the system 100 may comprise any number of UEs 102, any number of data stores, and any number of servers. The UE 102 may be any of a server computer, a desktop computer, a laptop computer, a notebook computer, a tablet computer, a mobile phone, a personal digital assistant (PDA), a media player, a headset computer, a wearable computer, a game console, an Internet digital media streaming device, a television, or another network/communications capable device. The network controller server 130 and the data store 150 may be server computers. The server 130 and the data store 150 may locate in one computer—for example a server computer, in two different computers—for example, a server computer for the network controller server 130 and another computer for the data store 150, in multiple different computers—for example, multiple server computers, or in some other combination of computers. When the network controller server 130 and the data store 150 are not located in one computer, the network controller server 130 and the data store 150 may share the same wired or wireless local area network.

The data storage 150 can comprise an NFV catalog 152 and an NFV library 154. The NFV catalog 152 can comprise a dynamic list of NFV functions, including those NFV functions currently executing. The NFV catalog 152 can maintain information on the execution location (e.g., a server network address), the status of the NFV function, routing protocols associated with the NFV function, a trusted state of the NFV function, and the like. The NFV catalog 152 can also maintain a list of the available execution locations for NFV functions, including those locations not currently executing an NFV function. The NFV catalog 152 can be accessed by the network controller server 130 to determine the available NFV functions, as described in more detail below. If a function is instantiated, paused, or ended, the NFV catalog 152 can be updated to reflect the changes.

The data storage 150 can also comprise an NFV library 154. The NFV library 154 may comprise a repository for the NFV functions that can be copied and instantiated on an available network resource, such as one or more of NFV servers 160, 170, 180. The NFV library 154 may act to store and serve the NFV function software to the NFV servers 160, 170, 180 as directed by the network controller server 130.

The NFV servers 160, 170, 180 represent physical servers configured to instantiate and execute network functions and provide the NFV functions. In an embodiment, the NFV server 160 can comprise a processor 162 having a normal execution portion 164 and a trusted portion 166. The NFV server 160 can also comprise a memory 168 for loading and storing the NFV function and various information for the NFV function. The memory 168 of the NFV server 160 may have a normal partition 167 and a trusted partition 169. The additional NFV servers 170, 180 also comprise processors, 172, 182 having normal partitions 174, 184 and trusted partitions 176, 186 and memories 178, 188 having normal partitions 177, 187 and trusted partitions 179, 189. While illustrated as three separate servers 160, 170, 180, the three servers 160, 170, 180 can represent different server blades on the same server or even be implemented in a single server.

The communication server 190 is configured to provide communication services for the UE 102. The communication server 190 can comprise a processor 191 including an optional trusted partition 193 and a normal partition 192. The communication server 190 can comprise a memory 195 that can store a communication application 196. The communication application 196 can execute on the processor 191 in the trusted partition 192 or the normal partition 193, depending on the type of communication being used.

The communication application 196 generally handles the call and data set-up and handshake procedures when a communication session is initiated between the UE 102 and one or more servers or another UE. In order to provide dynamic service chaining, the communication application 196 can be configured to monitor a communication being processed through the communication server 190 to detect a trigger. The trigger can comprise an indication that a network service is being requested during a communication session, and the trigger may be used to initiate the invocation of an NFV function. The trigger can include an explicit request from the UE 102 for a defined network function. For example, a user can provide an input to initiate a network function. For example, the user may select a conference call feature during a communication session that is received by the communication application 196 as a trigger for invoking the conference call function. In some embodiments, the UE 102 can receive an input and process the input to generate the trigger as a message. For example, the UE 102 may process a request for a conference calling feature and generate a trigger message that invokes the virtual conference call feature when received by the communication server 190.

In some embodiments, the trigger can be generated based on a specific data or communication request within the communication session. In this embodiment, the communication application 196 can monitor the communication session for specific voice and/or data requests both to and from the UE 102. For example, the communication application 196 can monitor the data session and determine if a streaming data file is requested. Upon receiving the request, the communication application 196 may determine that a data optimizer function is associated with the use of a streaming data request. In this example, the request for the streaming data serves as the trigger for the invocation of the data optimizer function. The communication application 196 may then initiate the process to chain the data optimizer function into the current communication session.

As part of the dynamic addition process, the communication application 196 can send a request to the NFV catalog 152 to determine if the NFV function is currently executing and/or available. The NFV catalog 152 may provide a list of one or more current instantiations of the requested NFV functions along with the corresponding states and routing information (e.g., an execution location, a network address, etc.). When an NFV function is available, the communication application 196 can assign the NFV function to the communication session in which the UE 102 is involved. The communication application 196 can update the NFV catalog 152 and send the routing information to the SDN controller application 142 to alter the routing of the communication session to include the NFV function.

In some embodiments, the requested NFV function may not be available. For example, all of the current instantiations of the NFV function may be assigned or there may not be any currently executing instantiations of the requested NFV function. In this instance, the communication application 196 may send a message to the SDN controller application 142, which may access the NFV library 154 and obtain a copy of the requested NFV function. The SDN controller application 142 and/or the communication application 196 can access the catalog 152 to determine an available execution location for the NFV function. The NFV function can then be sent to the available location and the NFV function can be executed. The NFV catalog can then be updated with the newly instantiated NFV function, and the NFV function can be assigned to the communication session for the UE 102 by the SDN controller application 142. The corresponding routing information can then be used by the SDN controller application 142 to provide the appropriate routing for the NFV function.

In some embodiments, the communication application 196 can be an NFV function executing on a server such as NFV server 160, NFV server 170, and/or NFV server 180. In these embodiments, the communication server 190 may represent a virtualized function, and the communication server 190 may not be present in the system 100. For example, the communication application may be a first communication service function responsible for providing the base connection and functionality for a communication session. Any incoming set-up request can be processed by the system 100 to set a routing protocol through the communication application as a first communication service function so that the communication application 196 can mediate the addition of further NFV functions during the remainder of the communication session using the active connection.

The network controller server 130 generally serves to receive requests for NFV functions and dynamically add the functions into a service chain during a communication session. The ability to dynamically create the service chain allows a service to be added during the communication session rather than having to set up the service chain prior to the initiation of the communication session. In an embodiment, the network controller server 130 receives a request for an NFV function and adds the NFV function to the service chain for a communication session. The network controller server 130 can be configured to provide NFV functions that are trusted or untrusted, using the appropriate execution environment for the processor 132. For example, a trusted NFV function may execute using a trusted environment 136 while a non-trusted NFV function may execute using the normal environment 134.

The memory 138 of the network controller server 130 can store an orchestrator application 140 and a Software Defined Network (SDN) controller application 142. The orchestrator application 140 serves to control the instantiations, operations, and routing for the NFV functions available to the UE 102 and update the NFV catalog 152 with the corresponding information. The orchestrator application 140 can receive requests for the NFV functions, for example from the SDN controller application 142, and locate or instantiate the corresponding NFV function for use with the communication session. If an NFV function is not currently available, the orchestrator application 140 can retrieve a copy of the NFV function and create an executing instance of the NFV function on a server such as NFV server 160, NFV server 170, and/or NFV server 180. Once the instance of the NFV function is created, the orchestrator application 140 can update the NFV catalog 152 to allow the instance of the NFV function to be accessed.

The SDN controller application 142 can execute on the processor 132 and configure the processor to provide the appropriate routing for the NFV functions in each communication session. In general, the SDN controller 142 can manage the routing tables throughout the network such as in router 118. Once the orchestrator application 140 provides the information on the NFV function, the SDN controller application 142 can then be configured to incorporate the NFV function into the routing for the communication session. During the communication session, a routing protocol can be used to define the communication routing between the UE 102 and the various network resources being accessed by the UE 102, including an end point such as a data store on a server and/or another UE 102 during a voice or data session. The routing protocol can comprise the routing information used by the various network components between the UE 102 and each end point, and the SDN controller application 142 can serve to control any updates in the routing tables of the network components (e.g., router 118, etc.) to properly route the communication session.

In response to receiving the NFV function information such as an execution location, routing information, or the like, the SDN controller application 142 can generate one or more routing updates that are sent to the various network routing elements. For example, an updated routing protocol can be provided to the router 118. Upon receiving the routing protocol, the router 118 can alter the network routing for the communication session to include the NFV function. The update of the routing protocol can occur for each communication session, and the routing protocol can be dynamically changes and number of times during a communication session in order to dynamically add or remove NFV functions during the course of an active connection.

Figure 2:
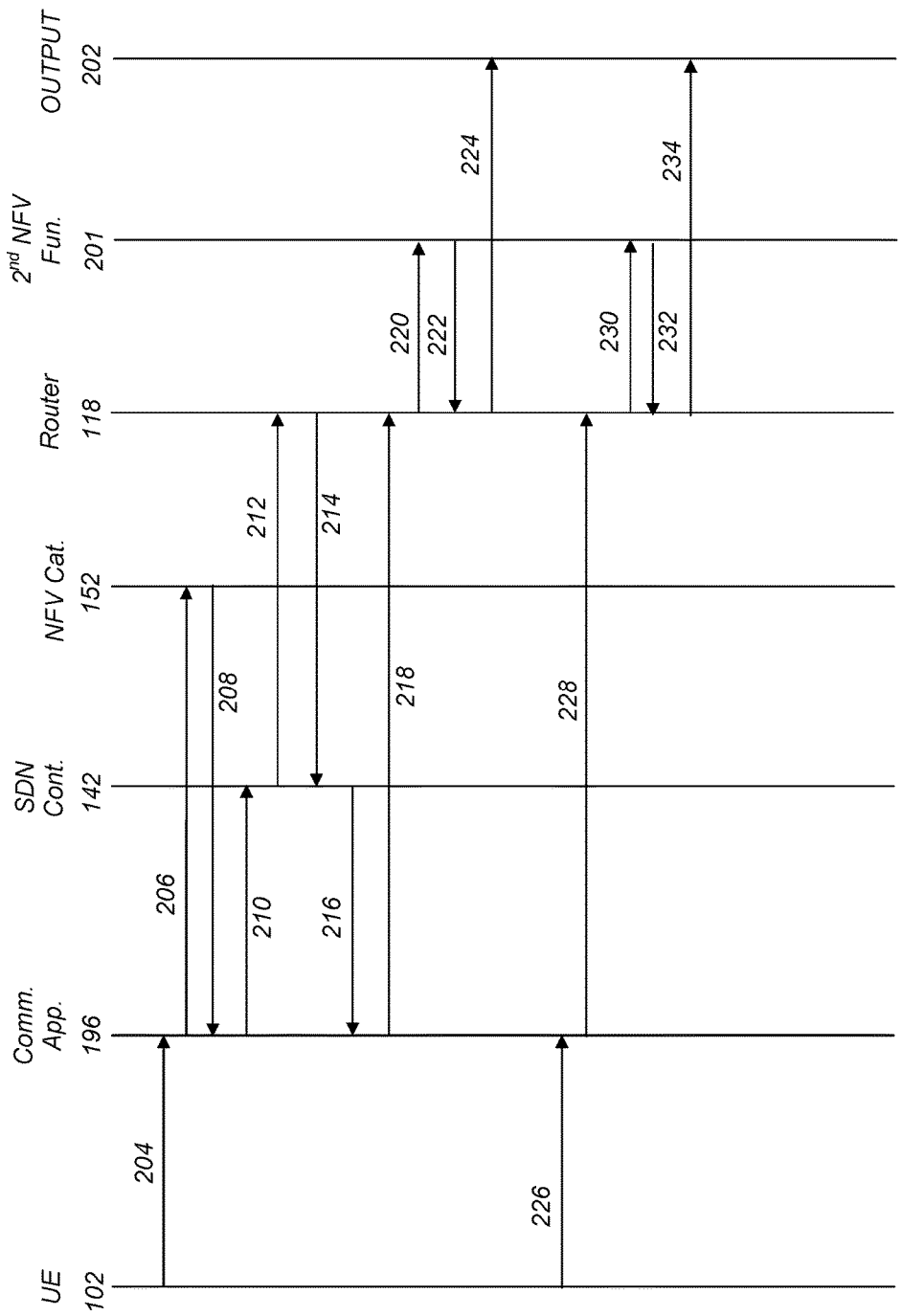
FIG. 2 illustrates a messaging diagram according to an embodiment of the disclosure.

The dynamic chaining is shown in the messaging diagram schematically illustrated in FIG. 2. During an active connection, the UE 102 can send a message 204 to the communication application 196 as a part of the communication session. The communication application 196 may provide a first communication service function. For example, the communication application 196 may provide voice services for the UE 102 and/or data services for the UE 102. The message 204 may comprise a trigger, which can be detected by the communication application 196.

The communication application 196 can determine a second communication service associated with the trigger. Once the second communication service function is identified, the communication application 196 can send a message 206 to the NFV catalog 152 to determine if an instance of the second communication service function is currently available, and if so, its location and routing information. The NFV catalog 152 can return a response 208 to the communication application 196 with the location information (e.g., a routing address, etc.) and routing information. When multiple instances of the second communication service function are available, the NFV catalog 152 and/or the communication application 196 can determine which instance to use. Factors including the relative load of each server, the routing latency, the presence of other communication functions executing at the same location, and the like may affect the choice of which instance of the communication function is used.

The communication application 196 can then send a routing message 210 to the SDN controller application 142 providing an updated routing protocol for the communication session. The SDN controller application 142 can then distribute the routing information in the routing protocol to the various routing elements in the network. For example, the SDN controller application 142 can send the routing information for the communication session to a router 118 in a notification message 212. The updated routing can be configured to route the current communication session from the UE 102 to the second communication service function location prior to passing the communications to an output 202, which can include a second endpoint for the communication session. The router 118 can return an acknowledgement message 214 that the routing for the communication session is updated. Additional routing messages can be sent by the SDN controller application 142 in order to update all of the applicable routers in the system. Once each of the routing elements has been updated per the updated routing protocol, the SDN controller application 142 can send a release message 216 to the communication application 196. The release message 216 may indicate that the dynamic addition of the second communication service was successful. Upon receiving the release message 216, the communication application 196 may resume routing of the initial message 204 to the second communication service function 201 through the router 118. For example, the initial message 204 can be forwarded to the router 118 as message 218. The router 118 may then forward the message 220 to the second communication service function 201. Once the message is processed by the second communication services function, the message can be routed to the output 202. In an embodiment, the message 222 can be sent from the second communication services function 201 to the router 118, which can route the message 224 to the output 202 based on the updated routing protocol provided during the dynamic addition process.

The UE 102 may then carry out further communications during the communication session through the second communication service function 201, which may comprise an NFV function executing on a server. For example, the communication session may comprise one or more messages 226 (e.g., data packets, or the like) being sent from the UE 102 to the communication application 196. The communication application 196 may be in the communication session pathway in order to provide a first communication service and monitor for a trigger or indication that another NFV function is being requested. The communication messages 228 may then proceed from the communication application 196 to the router 118. The updated routing table in the router 118 may result in the messages 230 being sent to the second communication service function 201. Once the messages are processed using the second communication services function 201, the messages 232 can be passed to the router 118 before being directed to the output 202 as message 234. The messaging configuration shown in FIG. 2 can be used to add two or more communication service functions that can be NFV functions executing on a server.

Figure 3:
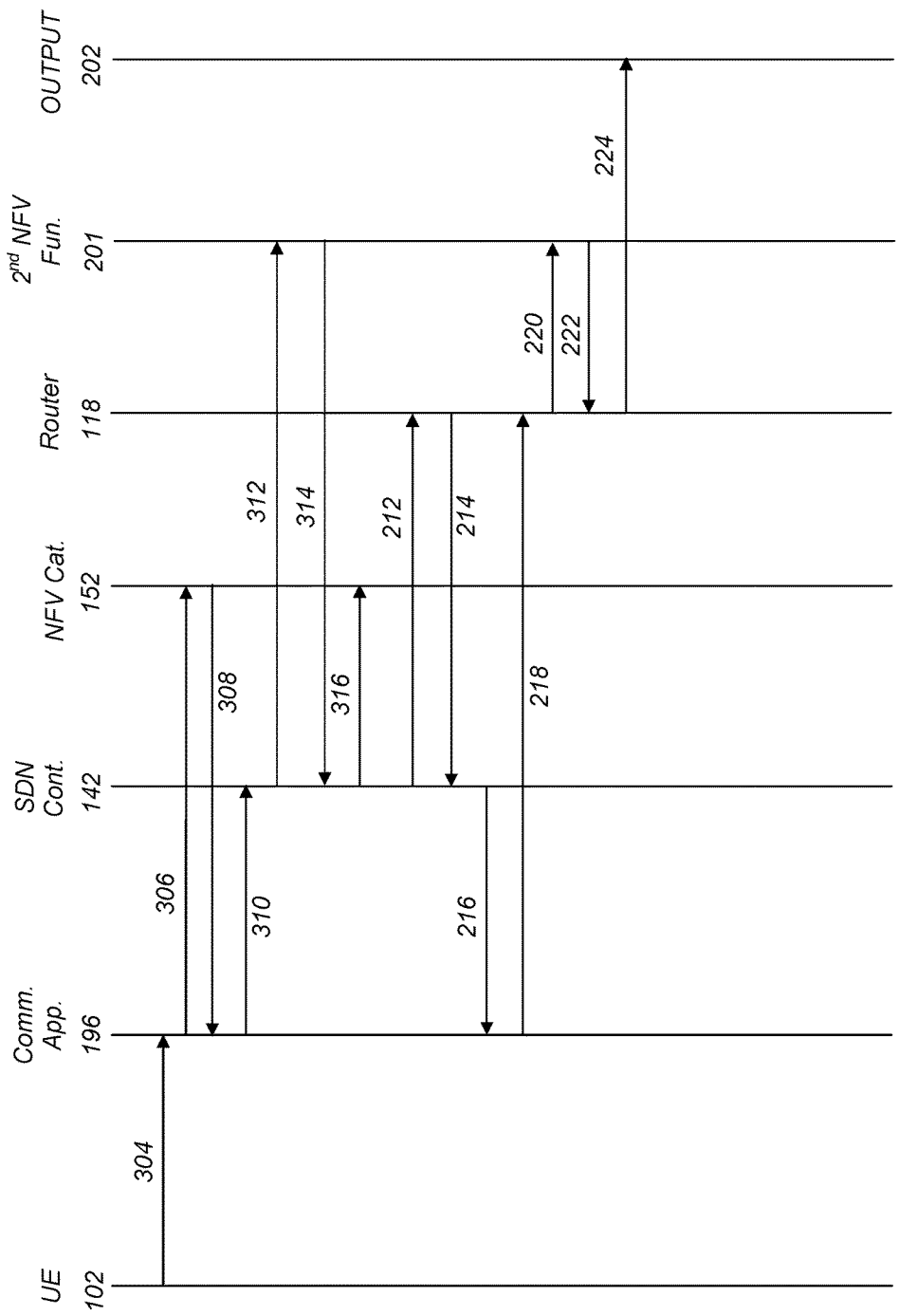
FIG. 3 illustrates a messaging diagram according to an embodiment of the disclosure.

In an embodiment, the communication service function may not be available when requested by the communication application 196. This scenario is illustrated in the messaging diagram shown in FIG. 3. As illustrated, the UE 102 can send a message 304 as part of the communication session on an active connection. The message 304 can comprise a trigger that requests that a second communication service function that is in addition to the first communication service function provided by the communication application 196 be added to the service chain during the communication session. In response to the trigger, the communication application 196 can determine a second communication service function that can be added to the service chain in the communication session. The communication application 196 can send the identity of the second communication service function to the NFV catalog 152 in a request message 306.

In response to the request, the NFV catalog 152 may respond with a reply message 308 that indicates that the second communication service function is unavailable. The second communication service function may be unavailable as a result of all of the executing instances of the second communication services function being assigned to other communication sessions or no instances of the second communication service function may be executing. As part of the response message 308, the NFV catalog 152 may provide an indication of one or more available execution locations for the second communication service function. The communication application 196 may forward the identity of the second communication service function and the available locations to the SDN controller application 142 in a message 310.

In response to receiving the message 310, the SDN controller application 142 may obtain a copy of the second communication service function, for example from the NFV library 154, and send the copy of the second communication service function to an NFV server having an available execution location. For example, a message 312 can be composed and forwarded to an NFV server capable of executing the second communication service function software. The NFV server may then execute the second communication service function to create an instance of the second communication service function that can be assigned to the current communication session. Once the instance of the second communication service function 201 is executing, the NFV server may respond with a notification message 314 to the SDN controller application 142 to verify the proper execution and availability of the second communication service function 201. The SDN controller application 142 may then forward the routing information and the execution location to the NFV catalog 152 in message 316 to update the NFV catalog. The remaining messages may be the same or similar to the steps as described above with respect to FIG. 2.

In some embodiments, NFV functions can be dynamically added to a communication session in the context of trust. Trust can include both the use of trustlets, trusted security zones, and/or hardware assisted security based trust zones. The dynamic addition of an NFV function to a communication session may be similar to the embodiments described above with some adjustments to account for the use of the trustlets and/or the trusted security zone.

A virtual computing environment operating system or the virtual server may incorporate support for trusted execution of logic and/or instructions (e.g., execution of the instructions in a trusted security zone). An application may be partitioned into a portion comprised of instructions that need not execute in the trusted security zone and a portion comprised of instructions that desirably do execute in the trusted security zone. The portion of instructions of an application that are desirably executed in the trusted security zone may be referred to as a trustlet. A trustlet may be thought of as an extract of a complete application—an extract of the specific instructions that desirably execute in a trusted security zone. The portion of the application that need not execute in the trusted security zone may be said to execute in the rich environment or permissive environment.

Some of the common functions of the network functions may be composed of a portion that executes in the rich environment and a trustlet that executes in the trusted security zone. When a request for trusted communication is received in the communication network the processing provided by some common functions (e.g., the policy function, the context function, a bearer function, etc.), the processing of that common function passes to the trustlet of that common function. The trustlet is instantiated to execute in a trusted security zone provided by the computing resources underlying the virtual server in which the subject common function and trustlet execute.

In an embodiment, a security monitor component executing on the virtual server determines that a request for trusted communication has been received and passes control to the trustlet. The security monitor may periodically poll the portion of the common function that executes in the rich environment. If a request is pending, the security monitor may retrieve some communication parameters that may be used by the trustlet to continue on with trusted communication with the requesting communication node (e.g., the enhanced node B). The communication interface between the security monitor and the portion of the common function executing in the rich environment is very lean to reduce the opportunity for corrupting the protections of trusted execution. For example, the parameters that the portion of the common function executing in the rich environment can pass in response to the security monitor's request may be strictly limited. When the trusted communication session is over, the security monitor may cause the portion of the common function to resume executing in the rich environment. In an embodiment, the security monitor may be a process that is part of the operating system on the computing resources. The security monitor may pause or stop the execution of the portion of the common application that executes in the rich environment or remove it from the scheduling sequence temporarily. The security monitor may pause or stop the execution of other processes in the rich environment when the trustlet is executing.

In an embodiment, some of the interfaces among the network functions may be changed as a result of the factorization of network functions into common functions. At the same time, some others of the interfaces may desirably remain unchanged, in order to maintain compatibility with external communication nodes (nodes outside of the network function virtualization computing environment, for example the enhanced node B). These may be referred to as 3GPP interfaces. Some examples of these outward facing interfaces are the S1 interface (S1-U, S1-C, etc.), the SGi interface, and the Rx interface. To provide for trusted communication between the enhanced node B and the network function virtualization system, the S1 interface is provided as part of a common function and is supported both by a portion of instructions that execute in the rich environment and a trustlet to support trusted communication from the enhanced node B.

Further, a system for trusted signaling in a long term evolution (LTE) wireless communication network is taught which can be used in combination with NFV functions. Signaling among long term evolution (LTE) network nodes may be performed to establish a bearer channel between a wireless communication device, herein after referred to as a UE (UE), and other communication devices such as another UE or an application server. When a UE desires to execute a trusted network application over the communication network or to conduct other trusted communications over the communication network, a trusted bearer path may desirably be created to promote a continuity of trust between the UE and a communication end point, for example a trusted application server that can provide an NFV function. As described in more detail below, trusted computation and/or trusted communication is based on hardware assisted security that reduces the ability of nefarious software or corrupt devices to write, read, or otherwise access trusted processing or trusted messages. For further details about creating a trusted bearer path, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety.

To provide trusted communications, however, the signaling that sets up the trusted bearer communication path may likewise desirably be conducted using a trusted signaling communication path. In an embodiment, a UE that is attached to the LTE network may execute a trusted application that executes some instructions in a trusted security zone of the processor of the UE. In some contexts herein a trusted security zone may include a trust zone and/or as a trusted zone. While executing in the trusted security zone, the trusted application may send a trusted security zone request to a home subscriber server (HSS) to receive a trust acknowledgement and one or more user parameters associated with the subject trusted application. The trusted security zone request may be received by an enhanced node B (eNB) or cell tower. The enhanced node B may handle the trusted security zone request by executing in a trusted security zone of the enhanced node B processor to send the trusted security zone request on to a mobility management entity (MME) or other signaling node in the LTE network. The mobility management entity may handle the trusted security zone request by executing in a trusted security zone of the mobility management entity processor to send the trusted security zone request on to the home subscriber server. The home subscriber server may handle the trusted security zone request by executing in a trusted security zone of the home subscriber server and sending a trusted security zone acknowledgment and optional use parameters back to the UE.

In an embodiment, the home subscriber server confirms that the UE has rights to execute a trusted service request before generating and sending the trusted security zone acknowledgment. For example, the home subscriber server may determine if the UE is subscribed to at least one trusted network application. For example, the home subscriber server may determine if the subscriber associated with the UE is deemed a trustworthy subscriber, for example whether the subscriber has a pending unresolved security or trust violation event history.

The user parameters may be parameters related to the trusted network application or other trusted communication that the UE is requesting. The user parameters may be credentials or tokens used to invoke methods or functions of an application programming interface (API) provided by a trusted network application server. The user parameters may identify data that the UE should provide to receive access to the requested trusted service or trusted communication. The user parameters may define a level of access to one or more trusted network applications to which the UE is allowed. The user parameters may define a biometric signature, a format of a biometric signature, and/or an encoding method of a biometric signature.

After trusted security zone processing is established in the signaling path to which it is attached, the UE may send a trusted service request from its trusted security zone to a policy and charging rules function node. It is understood that the trusted service request may be transported by a plurality of nodes in the long term evolution (LTE) network (or other technology network), each handling the trusted service request in a trusted security zone of their processor, for example the enhanced node B, the mobility management entity, the home subscriber server, and possibly other nodes. The policy and charging rules function node determines if the trusted service request meets the standards of a trusted communication and if the UE has rights to execute the requested trusted service. If the trusted service request is authorized, the policy and charging rules function node sends a trusted service acknowledge and optional use parameters over the signaling path to the UE. Said in other words, the policy and charging rules function confirms that a policy allows the UE to invoke the requested trusted service request before generating and sending the trusted service acknowledgment. Again, the trusted service acknowledgement and optional use parameters are transported by nodes executing in a trusted security zone of their processors. In an embodiment, the trusted service acknowledgement comprises trusted bearer communication link path information to support establishing and/or setting up the trusted bearer path. The trusted bearer path or trusted bearer channel is then activated, and the UE accesses the subject trusted services via the trusted bearer path.

When it has completed its access to the trusted service, the UE may send a trust termination request to the policy and charging rules function node, and the policy and charging rules function node may send a trust termination acknowledge back to the UE. The UE may then send an exit trusted security zone command to the enhanced node B while executing in the trusted security zone of the UE processor. After having sent the exit trusted security zone command, the UE may exit trusted security zone processing. The enhanced node B may then forward the exit trusted security zone command to the mobility management entity while executing in the trusted security zone of the enhanced node B processor. After having forwarded the exit trusted security zone command, the enhanced node B may exit trusted security zone processing. The mobility management entity may then forward the exit trusted security zone command to the home subscriber server while executing in the trusted security zone of the mobility management entity processor. After having forwarded the exit trusted security zone command, the mobility management entity may exit trusted security zone processing. The home subscriber server may then forward the exit trusted security zone command to the policy and charging rules function node while executing in the trusted security zone of the home subscriber server processor. After having forwarded the exit trusted security zone command, the home subscriber server may exit trusted security zone processing. The policy and charging rules function node may forward the exit trusted security zone command to a packet gateway while executing in the trusted security zone of the policy and charging rules function node. After having forwarded the exit trusted security zone command, the policy and charging rules function node may exit trusted security zone processing.

When it receives the exit trusted security zone command, the packet gateway may first mediate the tearing down of the trusted bearer path and then exit trusted security zone processing. Alternatively, other nodes in the trusted signaling path may control or mediate the tearing down of the trusted bearer path, for example before they exit processing in their trusted security zone. At this point in time, the trusted bearer path has been taken down. After the trusted bearer path has been taken down and after signaling returns to normal signaling, a normal bearer channel may be activated or brought up.

In an embodiment, the UE may have a need during a trusted communication session using a trusted bearer path to enter or obtain communication services from a foreign network (here the term "foreign network" is used to indicate a wireless communication network other than the primary network to which the UE has subscribed service). The UE may send a redirect request from its trusted security zone to the mobility management entity. The mobility management entity may probe the signaling endpoint in the foreign network to determine if the foreign network can support a trusted signaling path and a trusted bearer path to provide the requested end-to-end trusted communication bearer path. If the foreign network can support these trust needs, the trusted bearer channel is bridged into the foreign network where an end-to-end trusted bearer path is likewise provided to the UE.

A trusted security zone provides chipsets with a hardware root of trust, a secure execution environment for applications, and secure access to peripherals. A hardware root of trust means the chipset should only execute programs intended by the device manufacturer or vendor and resist software and physical attacks, and therefore remain trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust records, trust tokens, and/or trust symbols may be generated by the base layer of functionality and/or utilities of the trusted execution environment and/or trusted security zone for use in trusted end-to-end communication links to document a continuity of trust of the communications. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. The secure partition may be implemented by a first physical processor, and the normal partition may be implemented by a second physical processor. Alternatively, the secure partition may be implemented by a first virtual processor, and the normal partition may be implemented by a second virtual processor. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

Non-trusted applications are normal applications in the UE. When the trusted applications are executed in the trusted security zone, peripherals and data of the UE may not be accessible to the non-trusted applications. The non-trusted applications may be stored in a permissive sector in a memory. In an embodiment, the permissive sector of the memory is the normal partition in the memory. When the memory is not partitioned into trusted security zone(s) and a permissive sector, the non-trusted applications may be stored in the memory. Additionally, non-secure resources may be stored in the permissive sector in the memory.

Returning to FIG. 1, each component in the system may comprise a trusted security zone operating as a trustlet and/or as a hardware assisted trust in order to dynamically add an NFV function to a communication session operating in trust. Initially, the system 100 may establish an end-to-end trusted connection between the UE 102 and the communication application 196, which may be operating in trust as part of the end-to-end trusted connection. As part of the trusted NFV function addition, the NFV library must be accessed as well as a second NFV function that is operating in trust.

In an embodiment, the NFV catalog can operate in trust in order to establish an end-to-end trusted connection with the NFV catalog 152. For example, the NFV catalog 152 may be accessed by and executed in the trusted security zone 136 of the network controller server 130. Since the NFV catalog 152 can operate in trust, it may not be accessible to any other applications while it is being accessed as part of the addition of the NFV function. In order to provide access by a number of applications, the NFV catalog may use a semaphore to control access. In general, a semaphore creates a temporary copy of the NFV catalog 152 and checks on the catalog for use by an application (e.g., a trusted application). When access to the NFV catalog is ended, the copy can be checked back in using the semaphore and any updates can be loaded into the NFV catalog 152. In some embodiments, a request by a trusted application may generate a copy of the NFV catalog 152, and any changes can be maintained in a separate file. When access to the NFV catalog 152 is ended, the changes can be communicated to a non-trusted application and the changes can be applied to the regular NFV catalog 152. Any other suitable versioning control of the NFV catalog 152 can also be used when access to the NFV catalog 152 is limited, for example, based on accessing the NFV catalog 152 in a trusted state.

When a trusted connection is being used, the NFV function added to the trusted communication session may also be located on the same processor as a first communication service function. Since the execution of a trusted application on a processor may prevent the execution of any other applications, the operating location of an additional communication service function may be the same as any of the currently executing communication service functions. In some embodiments, the communication service function can be instantiated at a separate execution location if an end-to-end trusted connection can be formed from a first trusted communication service function to a second trusted communication service function.

The use of the system 100 with a communication session operating in trust can be described with respect to the messaging diagram in FIG. 2. Since portions of the messaging diagram are the same or similar to those messages described with respect to FIG. 2 above, the similar elements will not be described in detail in the interest of brevity. Initially, a trusted connection between the UE 102 and the communication application can be established, as described in detail herein. As part of the end-to-end trusted connection during the communication session, the UE 102 and the communication application 196 can execute in a trusted state.

During the active and trusted connection, the UE 102 can send a message 204 to the communication application 196 as a part of the trusted communication session. The message 204 may comprise a trigger, which can be detected by the communication application 196. The communication application 196 can determine a second communication service associated with the trigger. Once the second communication service function is identified, a trusted connection with the trusted NFV catalog 152 can be established. Since the accessing of the NFV catalog 152 may prevent access to the NFV catalog 152 by other applications, a copy of the NFV catalog or a semaphore can be used to allow access to the NFV catalog in a trusted state while allowing other devices to use the system to add communication service functions to active communication sessions.

The communication application 196 can send a message 206 to a trusted NFV catalog 152 to determine if an instance of the second communication service function is currently available, and if so, its location and routing information. The message 206 may comprise an identification of the second communication service function and an operating location of the communication application 196 to allow the location of an available second communication service function to be matched to the operating location of the communication application 196. The location can include the same processor, the same blade on a server, or the same server. The ability to co-locate the communication service functions may limit any interruption from the processing delays resulting from executing of the communication service functions in a trusted environment.

The NFV catalog 152 that is executing in a trusted environment can return a response 208 to the communication application 196 with the location information (e.g., a routing address, etc.) and routing information for the second communication service function. The location information can include the same location as the communication application 196 to allow the second communication service to execute at the same time as the communication application 196 in a trusted environment, which can include executing in the same trusted environment as the communication application 196.

The communication application 196 can then send a routing message 210 to the SDN controller application 142 providing an updated routing protocol for the communication session. As part of the trusted communication session, the SDN controller application 142 may be executing in a trusted environment and may be part of the end-to-end trusted connection. The SDN controller application 142 can then distribute the routing information in the routing protocol to the various routing elements in the network that are part of the end-to-end trusted connection. For example, the SDN controller application 142 can send the routing information for the communication session to a trusted router 118 in a notification message 212. In a trusted communication session, the router 118 may represent a communication element that is part of the end-to-end trusted connection. The updated routing can be configured to route the trusted communication session from the UE 102 to the second communication service function location prior to passing the communications to an output 202, which can include a second endpoint for the communication session. The router 118 can return an acknowledgement message 214 that the routing for the communication session is updated. Additional routing messages can be sent by the SDN controller application 142 in order to update all of the applicable routers in the system.

Once each of the routing elements has been updated per the updated routing protocol, the SDN controller application 142 can send a release message 216 to the communication application 196. The release message 216 may indicate that the dynamic addition of the second communication service in a trusted environment was successful. Upon receiving the release message 216, the communication application 196 may resume routing of the initial message 204 to the second communication service function 201 through the router 118. For example, the initial message 204 can be forwarded to the router 118 as message 218. When the message is processed by the communication application 196 and any additional communication service functions, which can include NFV functions, the functions may execute within one or more trusted environments (e.g., the same trusted environment, trusted environments in an end-to-end trusted connection, etc.) and may prevent access to the trusted environment(s) by any untrusted applications executing outside of the trusted environment. For example, the execution of any untrusted applications may be paused or otherwise prevented while the communication service functions are executing within the trusted environments. Additional trusted communication service functions can be added in a similar manner by repeating the steps shown in the messaging diagram.

When the trusted NFV catalog indicates that a trusted communication service function is not operating at the location specified in the message from the communication application 196 to the trusted NFV catalog, the second trusted communication service function can be instantiated on the location specified by the message. This may allow the second communication service function to execute at the same location as the communication application 196. In this embodiment, the communication application 196 can send a message to the SDN controller application 142 using an end-to-end trusted connection to obtain a trusted copy of the NFV function and instantiate the second communication service function in the location of the communication application 196. Once the second communication service function is sent to the proper location, the second communication service function can execute in a trusted environment, which can be the same trusted environment in which the communication application executes. The trusted communication session can then operate to provide a trusted communication session with the second communication service function in the communication session chain.

The system 100 described herein can be used to dynamically add a communication service function to a communication session. A communication session can be established between the UE 102 and the network or output (e.g., a second UE, data provider, etc.) in response to a setup request. A server receiving the setup request for the active connection can identify a first communication service function associated with the setup request. For example, a network component such as the enhanced node B or other network server may receive a setup request and identify a first communication service function for the communication session. In an embodiment, the first communication service function can be provided by the communication application, which may provide a voice call function and/or a data session management function. In an embodiment, the communication application 196 can execute on a detected server.

In some embodiments, the communication application 196 may comprise an NFV function. In this embodiment, the network component receiving the setup request can send a setup message to an NFV catalog. The message can comprise the identity of the first communication service function. The NFV catalog can respond with a location and routing information for the first communication service function. This information can be sent to the SDN controller application 142, which can define a session routing protocol for the communication session to include the first communication service function in the communication flow, for example, between the UE 102 and an output 202. The communication session can then be performed using the session routing protocol that includes the first communication service function. In an embodiment, the first communication service function can include the communication application 196 that serves to monitor the communications and messages to determine if a trigger is present for including an addition communication service function during the communication session.

Figure 4:
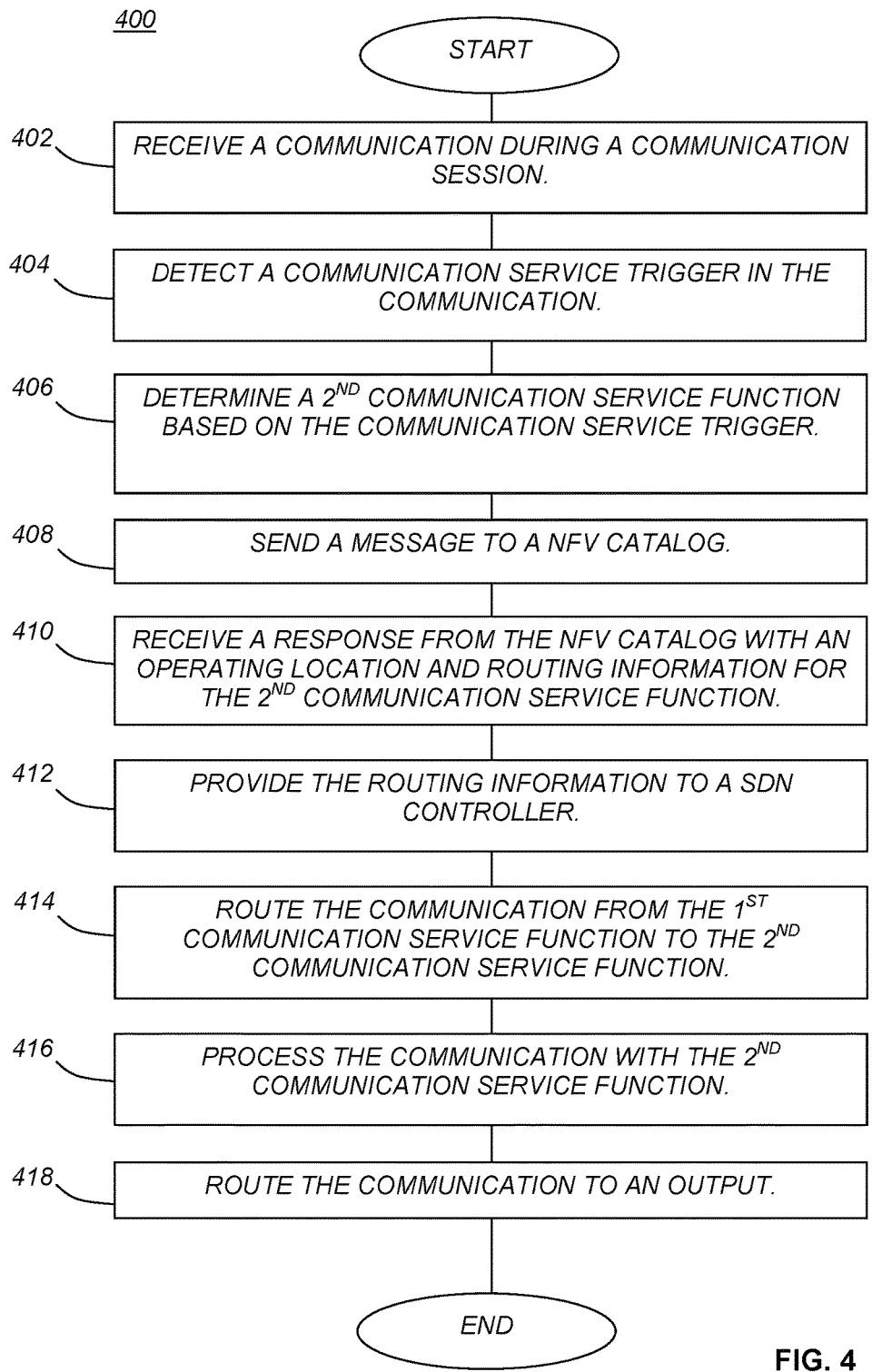
FIG. 4 is a flow chart of a method according to an embodiment of the disclosure.

FIG. 4 illustrates an embodiment of a method 400 for adding the communication service function to the communication session, which can occur over an active connection. In step 402, a communication can be received by the first communication service function during the communication session on the active connection. The first communication service function can detect a communication service trigger in the communication in step 404. For example, the first communication service trigger can detect a trigger that includes a request for the second communication service function. In some embodiments, the trigger can include a request for data that can be detected by the first communication service function and compared to a list of known trigger events. Upon detecting a match, the first communication service function may determine that a trigger is included in the communication.

Based on the trigger, the first communication service function can determine a second communication service function to include in the session routing protocol for the current communication session in step 406. For example, the second communication service function may include a voicemail function, a video optimization function, a parental control function, a video conferencing function, or a voice conferencing function. In order to include the second communication service function, a message can be sent to an NFV catalog 152 in step 408, where the message can comprise an identity of the second communication service function. The NFV catalog may include a list of executing NFV functions, their locations and associated routing information.

In step 410, a response can be received by the first communication service function from the NFV catalog. The response can include an operating location and routing information for the second communication service function 201. The first communication service function can then provide the routing information for the second communication service function to the SDN controller 142 in step 412. In general, the SDN controller 142 defines and controls the session routing protocol for each communication session. The SDN controller 142 can also distribute the routing information based on the session routing protocol to the routing elements in the network. Prior to receiving the message from the first communication service function, the session routing protocol can direct the communication session from the first communication service function to an output.

In response to the message from the first communication service function, the SDN controller 142 can include the second communication service function in a communication flow for the communication session. The SDN controller 142 can then distribute the updated session routing protocol to the network routing elements. In step 414, the communication can be routed from the first communication service function to the second communication service function. The communication, or any portion thereof, can then be processed with the second communication service function in step 416. The communication can then be routed to the output in step 418.

The method 400 of dynamically adding a communication service function to the communication session during an active connection can be repeated to add additional communication service functions to the communication session. For example, the first communication service function can receive a second communication during the communication session and detect a second communication service trigger in the second communication. The first communication service function can then determine a third communication service function based on the communication service trigger. A second message can be sent by the first communication service function to the network function virtualization catalog that comprises an identity of the third communication service function. The first communication service function can receive a response from the network function virtualization catalog that comprises an operating location and routing information for the third communication service function. The first communication service function can provide the routing information to the SDN controller, which can set the routing protocol to include the third communication service function in the communication flow for the communication. The communication can then be routed through the first communication service function, the second communication service function, and the third communication service function. The communication session can then continue with the routing of the second communication to the second communication service function and the third communication service function, where the second communication service function may be processed in each communication service function as applicable before being routed to the output. When three or more communication service functions are present in the communication session, the routing order for the second and subsequent communication service functions can vary based on the specific processing needed.

The routing order can be determined by the first communication service function or another network server may determine the order. If the order is changed, the session routing protocol can be updated to add the new communication service function to the end of the routing order, or added before another communication service function. The SDN controller 142 can then update the routing order in the network to appropriately route the communication session communications through the selected order.

Figure 5:
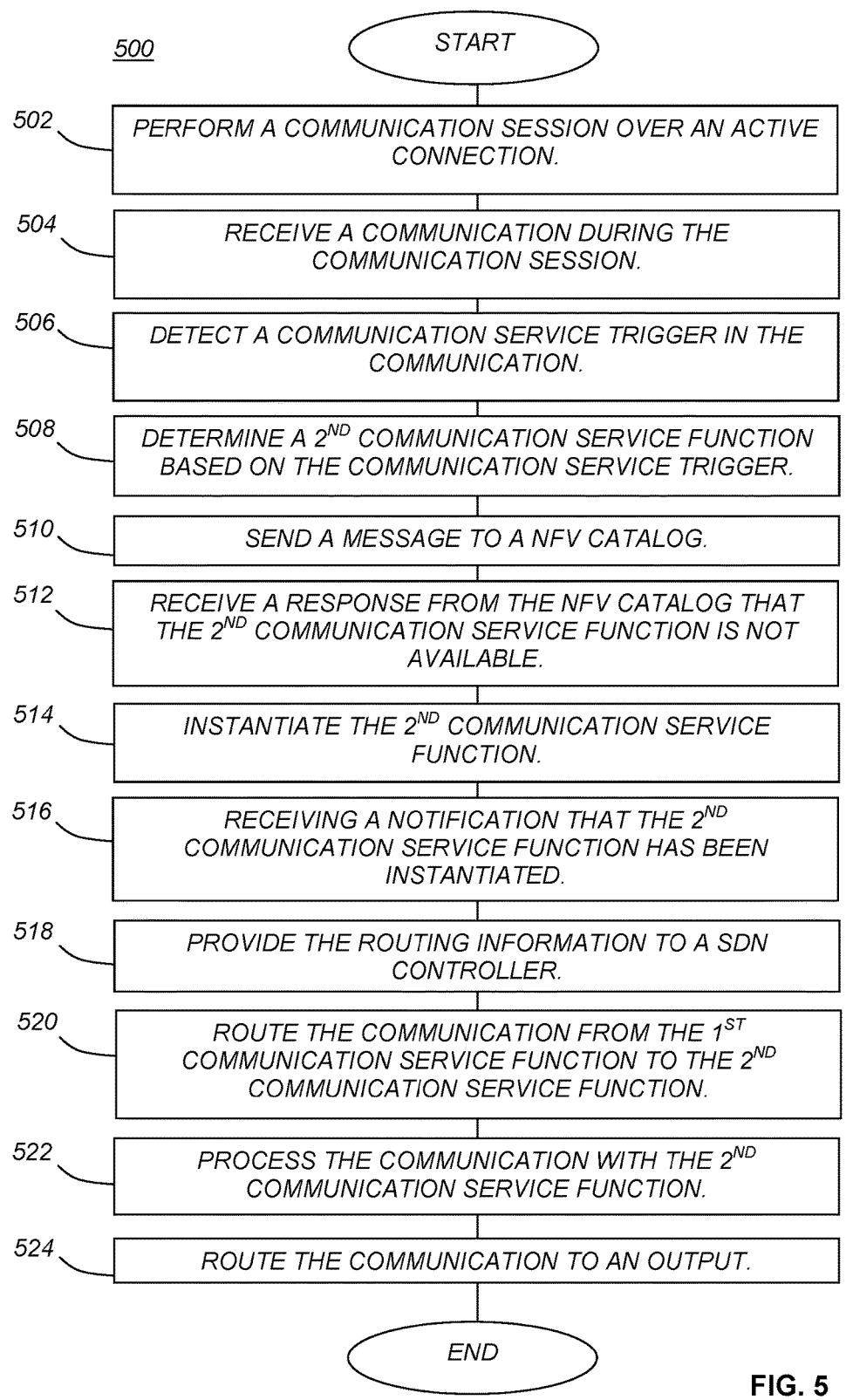
FIG. 5 is another flow chart of a method according to an embodiment of the disclosure.

FIG. 5 illustrates another embodiment of a method 500 for adding a communication service function to a communication session during an active connection. At step 502, a communication session can be performed or carried out over an active connection. The communication session can be performed using a session routing protocol that defines a communication path through a first communication service function executing on a server. In an embodiment, the first communication service function can include a voice call function or a data session management function. In some embodiments, the session routing protocol can be created during the setup of the communication session (e.g., in response to the setup request). The session routing protocol can be distributed to and stored in the network routing components used with the communication session. For example, a router in the communication session pathway can have the session routing protocol, or a portion of the routing instructions stored therein, for use during the communication session.

At step 504, the first communication service function can receive a communication during the communication session. A communication service trigger can be detected in the communication in step 506. For example, the first communication service can monitor the communication during the communication session to detect one or more triggers in the communications that are part of the communication session. Based on the trigger, a second communication service function can be determined in step 508. In an embodiment, the second communication service function can include a voicemail function, a video optimization function, a parental control function, a video conferencing function, a voice conferencing function, or any combination thereof.

At step 510, a message can be sent to the NFV catalog 152 that includes an identity of the second communication service function. At step 512, a reply can be received from the NFV catalog that includes an indication that the second communication service function is unavailable. The second communication service function may be unavailable due to all of the currently executing instances of the second communication service function being assigned to other communication sessions or no instances of the second communication service function may be executing. In some embodiments, the reply from the NFV catalog 152 can include a list of one or more available resource locations that are available to execute an instance of the second communication service function.

At step 514, the second communication service function can be instantiated on a server. For example, the first communication service function may send a message comprising the identity of the second communication service function to the SDN controller 142. The first communication service function may also provide the list of available resource locations for instantiating the second communication service function if the list is available. Alternatively, the SDN controller 142 may obtain a list of available resource locations for the second communication service function from the NFV catalog 152 directly. The SDN controller 142 can obtain a copy of the second communication service function and pass the copy to an available resource location, or the SDN controller 142 can direct the NFV library to send the copy directly to the available resource location. Once the copy of the second communication service function is loaded into an available resource location, the copy may execute to create the instance of the second communication service function.

At step 516, the first communication service function may receive a notification of the instantiation of the second communication service function along with the routing information. At step 518, the routing information can be provided by the first communication service function to the SDN controller 142 if the SDN controller 142 does not already have the routing information. The SDN controller 142 can use the routing information to redefine the session routing protocol to include the second communication service function in a communication flow for the communication session.

The communication session may then continue with the second communication service function in the communication session flow. For example, at step 520, the communication can be routed from the first communication service function to the second communication service function. The communication can then be processed with the second communication service function in step 522 before being routed to the output in step 524.

When the second communication service function is not available upon request, the instantiation of the second communication service function can be recorded by the NFV catalog 152. For example, the identity and routing information for the second communication service function can be sent to the NFV catalog by the first communication service function 196 or the SDN controller 142. The information can then be stored by the NFV catalog for use with future communication sessions. For example, when the communication session ends, a release message can be generated and sent to the NFV catalog to release the assignment of the first, second, and any subsequent communication service functions to the communication session with the UE 102. Any subsequent communication sessions by the same UE 102 or other UEs can then access the first, second, or subsequent communication service functions.

Figure 6:
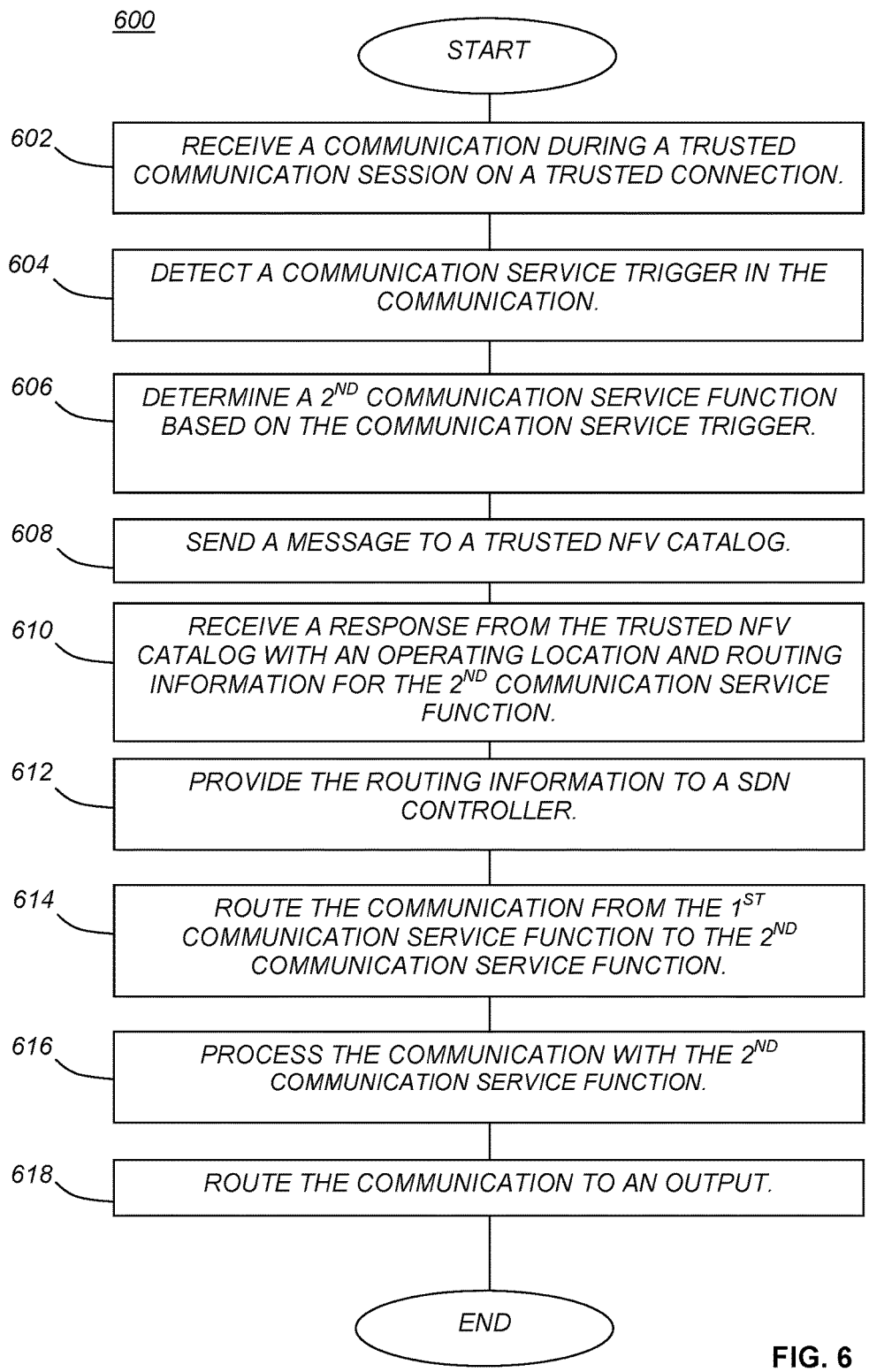
FIG. 6 is still another flow chart of a method according to an embodiment of the disclosure.

In some embodiments, the communication session may take place in a trusted environment. Referring to FIG. 1, an end-to-end trusted connection can be established between a server hosting a first communication service function 196, the SDN controller 142, and a UE 102 in order to carry out the communication session using trust. This system may then be used to carry out a method 600, as illustrated in the flow chart of FIG. 6, of dynamically adding a communication service function to a trusted connection.

In step 602, a communication can be received at a first communication service function executing on the server during a trusted communication session. The first communication service function can detect a communication service trigger in the communication in step 604, and a second communication service function can be determined based on the trigger in step 606. At step 608, a message can then be sent to a trusted NFV catalog that identifies the second communication service function and an operating location of the first communication service function. The trusted NFV catalog can execute in trust and can include a list of executing trusted applications, the execution location of the executing trusted applications, and routing information for each executing trusted application.

The trusted NFV catalog 142 can operate in trusted environment (e.g., the NFV catalog 142 can comprise a trusted security zone), which may cause any non-trusted applications operating in the same location (e.g., on the same processor or system) to pause execution or otherwise be prevented from executing. In order to allow other communication sessions to access the NFV catalog 152, the trusted NFV catalog 152 can use a semaphore. The semaphore may allow the NFV catalog to be accessed within a trusted security zone. Any updates occurring during the trusted processing can update the version of the NFV catalog subject to the semaphore control. While the NFV catalog 142 is being accessed in the trusted security zone, the execution of all applications executing on the same processor outside of the trusted security zone can be disabled. Once the access of the trusted NFV catalog is complete, the trusted NFV catalog 142 subject to the semaphore control can be closed and the version or copy can then be released by the semaphore for further access by other communication sessions. Any changes made during the use of the copy can be synchronized with the information in the master NFV catalog 152, which may allow the NFV catalog to maintain a current operating list of NFV functions even when accessed in a trusted environment.

At step 610, a response can be received from the trusted NFV catalog 152 that includes an operating location and routing information for the second communication service function. In an embodiment, the operating location of the second communication service function can be the same as the operating location of the first communication service function. This may allow both communication service functions to operate at the same time without being disabled with other applications executing outside of the trusted environment.

At step 612, the routing information for the second communication service function can then be provided to the SDN controller 142 so that the session routing protocol can be updated to include the second communication service function in a communication flow for the trusted communication session. The session routing protocol can be distributed to the network elements in the end-to-end trusted connection including the server executing the first communication service function. This may allow the communication in the communication session to be routed from the first communication service function to the second communication service function at step 614. The communication can be processed with the second communication service function in step 616 before being routed to the output in step 618. Subsequent communications during the trusted communication session can then be processed through both the first communication service function and the second communication service function. Additional communication service functions can be added by repeating the method 600.

Figure 7:
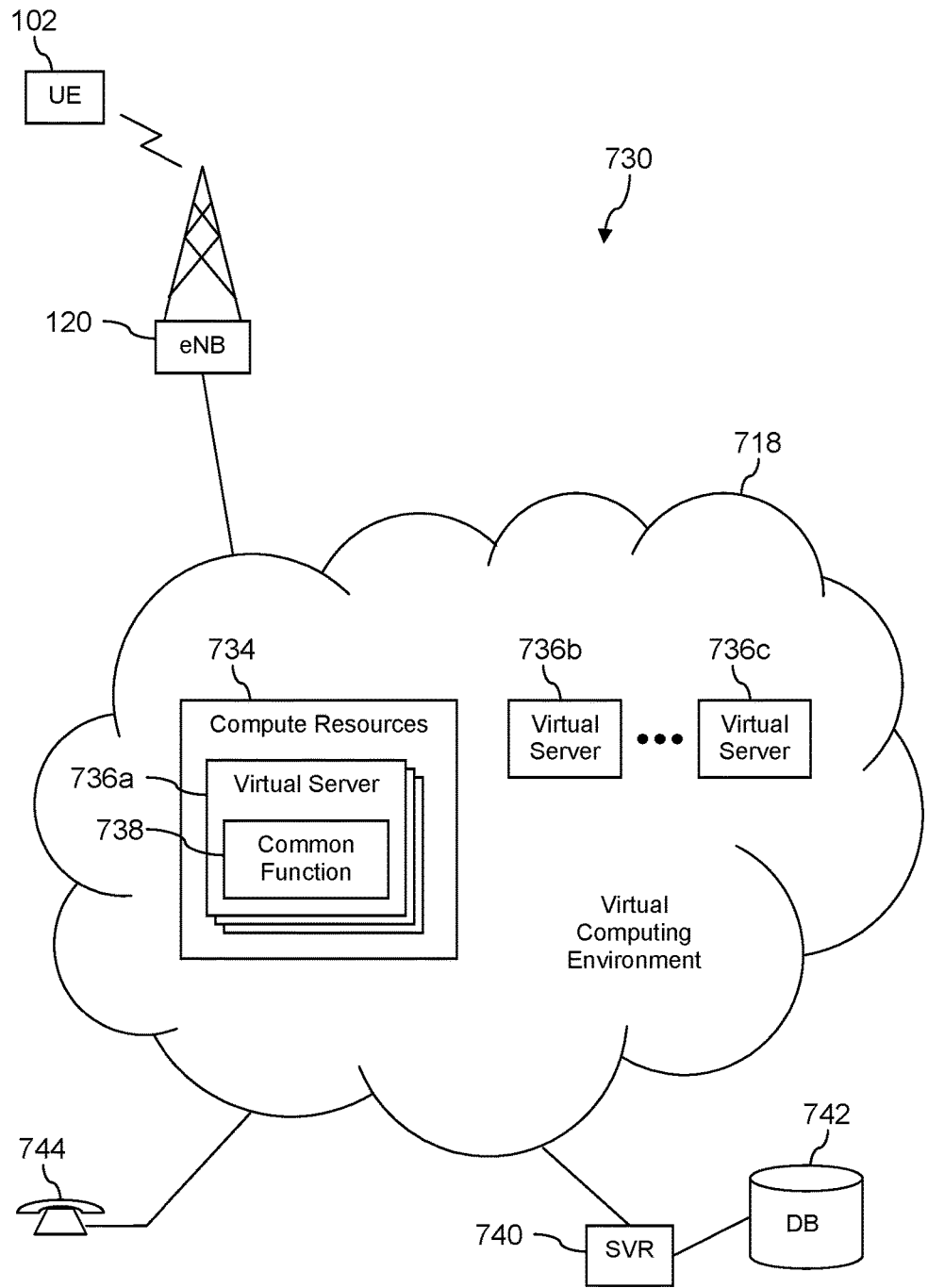
FIG. 7 is a block diagram of virtual computing environment according to an embodiment of the disclosure.

Turning now to FIG. 7, the virtualized network function communication paradigm is described in more detail. The traditional communication network may be considered to comprise isolated servers, each isolated server providing one of the network functions. The network functions can include communication functions as well as more specific subscriber functions. In some cases, to handle communication processing loads, a network function may be distributed on a plurality of servers. It is understood that the communication network may comprise any number of communication nodes, notably routers and other servers.

Each of the traditionally structured network function servers provide processing functionality by executing one or more functions. For example, network communication functions for voice and data services can include a network attach function, an authentication function, a mobility function, a bearer function, a context function, a policy function, and a data function. Since some of these functions are performed by a plurality of network function servers, there is duplication of these functions in the traditionally structured network. This duplication may result in maintenance and/or common behavior problems over time.

One skilled in the art understands what these functions are, but for the sake of others reading this specification a thumbnail description of the functions is provided here. It is understood that the described common functions may perform additional tasks or functions that may not be mentioned here. It is further understood that other common functions may be factorized from traditional network functions and may be supported by the network function virtualization paradigm using the virtual computing environment 718.

The network attach function provides functions that may be used by a service to attach to the network and communicate (e.g., a network attach function may be performed on behalf of the UE 102 in order for it to obtain communication service on the network). The authentication function provides functions that may be used to authenticate users, for example to authenticate a user of the UE 102 who wishes to obtain communication service on the network. The mobility function provides functions to support mobile communications, for example handoffs and continuity for the UE 102 when it is engaged in a voice call, data session, or other communication session. A bearer function provides functions that contribute to maintaining a network connection over a period of time to support providing communication service (e.g., to carry bearer traffic). The context function provides functions that promote service continuity during handoff, interruption, or transfer. The policy function provides functions to support policy managed or policy constrained access to or use of a service. The data function provides functions to support data creation, reading, update, and deletion (CRUD) functions. One or more of these functions can be provided by the communication application 196, which may be described as providing voice and/or data service functions for the UE 102.

Using NFV functions, the communication network can be restructured, at least in part, to include common functions executing in virtual servers in a virtual computing environment. The common functions can be called by a state control application that provides one of the traditional network functions by calling the appropriate common functions and passing parameters or intermediate results between and/or among the common functions in a desired sequence. For example, an attach common function may execute in a first virtual server, an authentication common function may execute in a second virtual server, a mobility common function may execute in a third virtual server, a bearer common function may execute in a fourth virtual server, a context common function may execute in a fifth virtual server, a policy common function may execute in a sixth virtual server, and a data common function may execute in a seventh virtual server. This restructuring of the traditional siloed network functions into common functions may be referred to as network function factorization or factorization. Different traditional network functions would be associated with different state control applications and would execute on different virtual servers.

Additional NFV functions such as subscriber services can be provided in a similar manner. For example, each subscriber function such as a voicemail function, a video optimization function, a parental control function, a video conferencing function, or a voice conferencing function can be comprised of one or more individual functions. The individual functions can each execute on a virtual server and interface through a series of calls that can pass parameters and intermediate results by and/or among the individual functions to enable the NFV function to be carried out. Each of the virtual serves in this paradigm can be located on different servers, on a single processor in a server, or on one or more processors in a server (e.g., different server blades, etc.)

A single virtual server may concurrently execute a plurality of instances of a common function. For example, a first virtual sever may concurrently execute two instances of the attach common function, four instances of the attach common function, eight instances of the attach common function, or some other number of instances of the attach common function. Additionally, a plurality of virtual servers, each executing instances of the same common function, may be deployed to carry a communication load. For example, 2, 3, or more instances of a first virtual sever may execute instances of the attach common function. In an embodiment, any one virtual server executes instances of only one common function. For example, no virtual server would concurrently execute instances of different common functions. In some embodiments, any one virtual server may execute different functions. Further, the execution of a plurality of virtual servers on a single processor may allow for trusted processing between two or more virtual servers executing different functions.

Turning now to FIG. 7, a communication system 730 is described. From some points of view, the communication system 730 is substantially similar to the communication system 100 described above with reference to FIG. 1. For example, from the point of view of the UE 102 and the enhanced node B 120, the systems 100, 730 may be indistinguishable. From the point of view of a content server 740 (or application server) or of a telephone 744, the systems 100, 730 may be indistinguishable. Communication between the enhanced node B 120 and the content server 740 or the telephone 744 provides data and/or voice services in substantially similar ways over substantially similar interfaces, regardless of what implementation of the core network—system 100 or system 730—is deployed. The use of a virtual computing environment 718 to provide at least some of the core network functionality can provide significant advantages to the wireless communication service provider.

The virtual computing environment 718 may support ease of maintenance, ease of upgrading, ease of expansion and contraction of computing resources. The virtual computing environment 718 may be provided with a private environment of computer resources or with a public deployment of computer resources. Said in another way, the virtual computing environment 718 may be a private cloud computing environment owned, operated, and managed by a wireless communication service provider. Alternatively, the virtual computing environment 718 may be a public cloud computing deployment owned, operated, and managed by a cloud computing service provider and supporting not only the core network functionality of a wireless communication service provider but also supporting computing needs of web-based enterprises, large on-line retail sales enterprises, governmental entities, and the like.

The virtual computing environment 718 may comprise a variety of computing resources 734. The computing resources 734 comprise processors (e.g., microprocessors, digital signal processors, graphics processors), main memory, mass memory (e.g., disk drives), and network interfaces. The processors may comprise a single processor unit or may comprise multiple processor units. For example, a processor may comprise a quad-core processor having four distinct processing units. Alternatively, a processor may contain some other number of distinct processing units. The mass memory may be located in physical proximity to the computer blade on which a virtual server executes that uses the mass memory. Alternatively, the mass memory may be located remote from the computer blade on which the virtual server 736 executes and may be addressed or accessed logically. The computing resources 734 may be partly deployed as blade computers in a rack of an equipment cabinet. A single virtual server 736 may execute on one computer host or computer blade, or a plurality of virtual servers 736 may execute on one computer host or computer blade.

The virtual server 736 may be built or deployed as a server image. A server image may comprise instructions or logic that can be loaded into main memory of a computing resource (e.g., a blade computer, etc.) or on top of a hypervisor and then executed to provide the functionality of the virtual server. A server image may be viewed as a kind of template for creating or instantiating a virtual server. The same server image may be used to instantiate multiple virtual servers, either on the same computing resource or on separate computing resources. The server image may be constructed or built targeted to a category or class of computing resources, and a virtual server instantiated from that server image may take advantage of or employ the computing resources that comport with that class of computing resources. For example, when a first server image is built according to a class of computing resources that includes a graphics processor, a virtual server instantiated from that first server image may employ the resources of one or more graphics processors. When a second server image is built according to a class of computing resources that includes a trusted security zone, a virtual server instantiated from that second server image may employ the resources of a trusted security zone.

The virtual computing environment 718 may comprise a first virtual server 736a executing on the computing resources 734 that performs processing of a common function 738. A second virtual server 736b and a third virtual server 736c may likewise execute on the computer resources 734 and may perform processing of the same common function 738 or different common functions. It is understood that the computing resources 734 may be viewed as the collection of all the computing resources in the virtual computing environment 718: a plurality of processors, main memories, mass memories, and network interfaces. The virtual computing environment 718 may comprise any number of active or instantiated virtual servers 736.

A communication may be initiated by the UE 102 by establishing a wireless communication link with the enhanced node B 120. The enhanced node B 120 may establish a communication link with the virtual computing environment 718, for example over a data communication interface such as an S1-U interface or an S1-C interface. The communication may be serviced by a plurality of network virtual functions and a plurality of common functions within the virtual computing environment 718 and link to the content server 740 to access content stored in a datastore 742 or to link to the telephone 744 to conduct a voice call.

In an embodiment, the UE 102 initiates a trusted communication, for example to access confidential information via the content server 740 and the datastore 742 (e.g., medical records, bank account information, or credit history information). The wireless link between the UE 102 and the enhanced node B 120 may be deemed to be inherently trusted or secure from hacking. The enhanced node B 120 may request a trusted communication link with the content server 740 by engaging in trusted signaling with the virtual computing environment 718. The enhanced node B 120 sends a trusted link request via a S1 interface to the virtual computing environment 718. A virtual server 736 may recognize the trusted link request and cause a common function 738 to transition to executing its trustlet. The trustlet executes in a trusted security zone provided by the underlying computing resources 734 in which the subject trustlet and virtual server 736 execute. The trustlet sends trust tokens to the enhanced node B 120 via the S1 interface, and a trusted communication link is established between the common function 738 and the enhanced node B 120. The trustlet may then signal with other virtual servers 736 and other common functions 738 to provide the appropriate virtualized network functions to support the desired trusted communication. One of the common functions may be the bearer common function 738 that provides the trusted communication link to the server 740. The bearer common function 738, likewise executing in its trustlet in a trusted security zone of the computing resources 734 in which its virtual server 736 executes, signals with the content server 740 to establish a trusted communication link. When the content server 740 provides the appropriate trust tokens and handshaking, the end-to-end trusted bearer path from the UE 102 to the content server 740 (or to the telephone 744, depending on the communication scenario) may be established.

Figure 8:
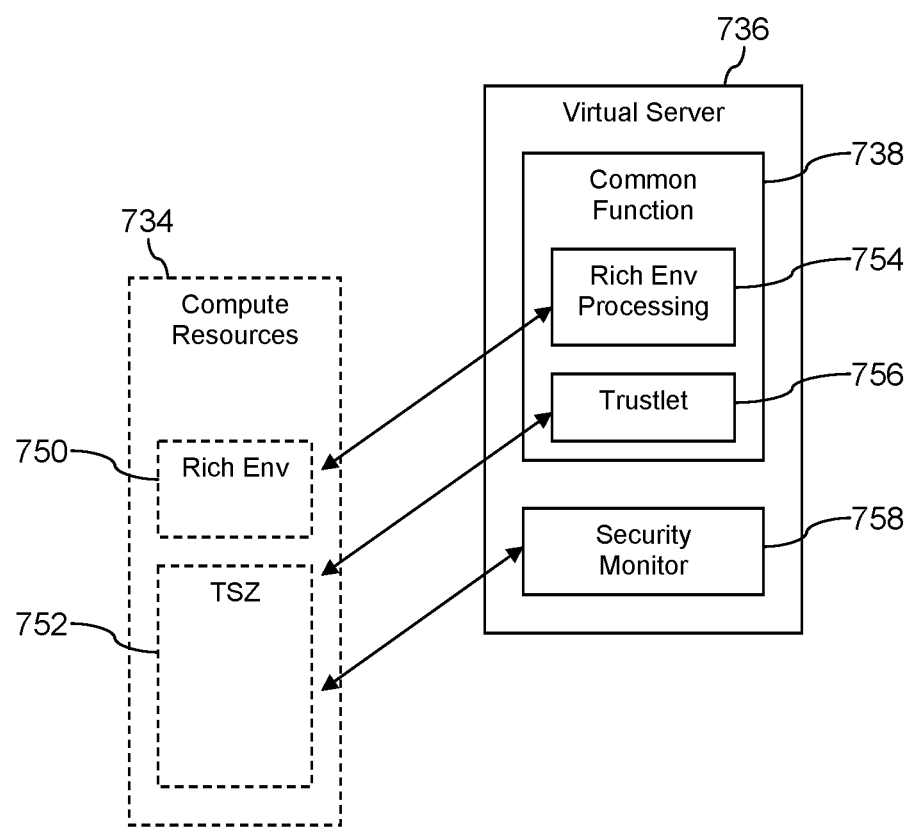
FIG. 8 is a block diagram of the relationship between an executing virtual server and compute resources on which the virtual server is executed according to an embodiment of the disclosure.

Turning now to FIG. 8, the overlay of a virtual server 736 on computing resources 734 is described. The virtual server 736 executes using computing resources 734. The virtual server 736 may not directly interact with the computing resources 734 and instead may run on top of a hypervisor or on top of a logical operating system (an operating system that itself operates in the context of another operating system). Notwithstanding, the processing provided by the virtual server 736 is performed using the computing resources 734. The computing resources 734 may comprise a rich environment 750 and a trusted security zone 752. The details of trusted security zones are described further above. To briefly reprise here, a trusted security zone provides hardware assisted trust or hardware assisted security. A trusted security zone may comprise a portion of main memory. An operating system may mediate access to the main memory and may enforce the constraint that only instructions executing in trust may access the trusted portion of memory. Alternatively, the trusted portion of main memory may be physically isolated and only physically accessible to a trusted portion of a processor. A trusted security zone may be supported by a fundamental operation mode of processor units that prevents other potentially untrusted instructions executing concurrently with the trusted instructions (e.g., intercalated with the trusted instructions, as in a context switching situation or possibly when executed on a co-processor of a multi-core processor).

The rich environment 750 is the portion of main memory that is not trusted and any mass memory allocated to the virtual server 736. The rich environment 750 comprises the processor units that are not configured to have a trusted mode of operation or are not currently operating in a trusted mode of operation. The rich environment 750 may be considered to further comprise operating system commands that are disallowed when executing in the trusted mode of operation and/or accessing network interfaces that may be disallowed when executing in the trusted mode of operation.

The common function 738 executing in the virtual server 736 may comprise rich environment processing logic or instructions 754 and a trustlet 756. The rich environment processing 754 executes in the rich environment 750 of the computer resources 734, and the trustlet 756 executes in the trusted security zone 752. A security monitor 758 may be part of an operating system in which the virtual server 736 executes or may be provided as part of the server image that is used to instantiate the virtual server 736. The security monitor 758 executes in the trusted security zone 752. The virtual server 736 may be configured or created to map execution of the trustlet 756 and the security monitor 758 to the trusted security zone 752. The security monitor 758 may be referred to in some contexts as a security monitor module or a security monitor component.

The security monitor 758 may be configured with an execution invocation handle (e.g., a logical address) of the trustlet 756 that it can use to launch and terminate the trustlet 756. The security monitor 758 may further be configured with the location of a trust flag in main memory of the computing resources 734 or configured with a logical address that the operating system may map to a physical address to access the trust flag in main memory. The security monitor 758 may periodically poll the trust flag. When the trust flag is unset, no trusted communication request is pending. When the trust flag is set, a trusted communication request is pending. The security monitor 758 may further be configured with a physical address of a trusted communication request parameter list (or a logical address that the operating system can map to the trusted communication request parameter list). To handle a pending trusted communication request, the security monitor 758 may access and read the trusted communication request parameters. The security monitor 758 may first validate the trusted communication request parameters, for example validating a trust token provided in the parameters list.

The security monitor 758 may then cause the operating system to (or may itself) pause the rich environment processing 754 and may instantiate the trustlet 756, passing the trusted communication request parameters to the trustlet 756. Instantiating the trustlet 756 may be referred to in some contexts as allocating the trustlet 756 or allocating the trustlet 756 to the common function 738. The trustlet 756 may then handshake with the requesting communication node or common function and carry on trusted communications. When the trustlet 756 indicates that the trusted communication session is completed, the security monitor 758 may terminate the trustlet 756 and cause the rich environment processing 754 to resume execution.

In an embodiment, the security monitor 758 may maintain a registry of trustlets 756, for example in the situation where a plurality of instances of the common function 738 are executing on the same virtual server 736. The registry of trustlets 756 may comprise information associated with instantiated trustlets 756, for example an execution handle to use in communicating with each instantiated trustlet 756, a trust token, state information such as communication parameters associated with the instantiated trustlet 756. In some embodiments, the registry may be accessible by the NFV catalog or may be a portion of the NFV catalog.

Figure 9:
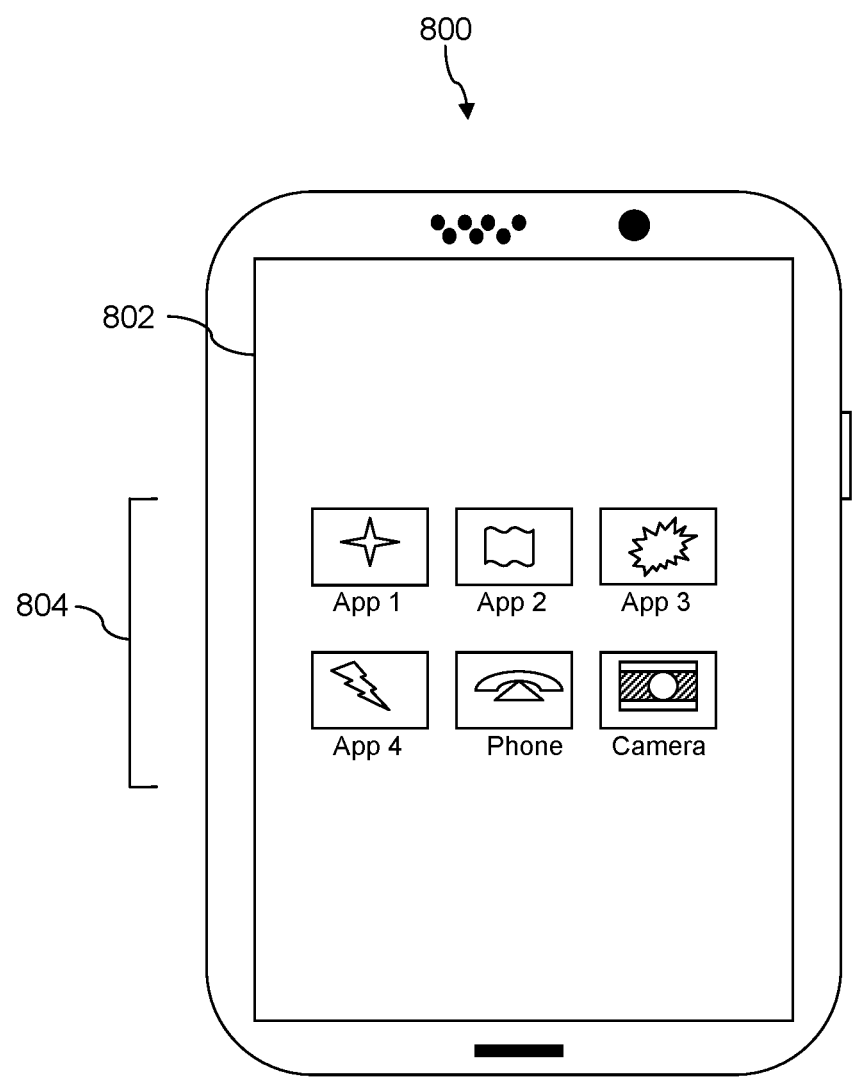
FIG. 9 is an illustration of a handset according to an embodiment of the disclosure.

FIG. 9 depicts the mobile device 800, which is operable for implementing aspects of the present disclosure, but the present disclosure should not be limited to these implementations. Though illustrated as a mobile phone, the mobile device 800 may take various forms including a wireless handset, a pager, a personal digital assistant (PDA), a gaming device, a media player, or a wireless enabled computer, for example a long term evolution wireless enabled computer. The mobile device 800 includes a display 802 and a touch-sensitive surface and/or keys 804 for input by a user. The mobile device 800 may present options for the user to select, controls for the user to actuate, and/or cursors or other indicators for the user to direct. The mobile device 800 may further accept data entry from the user, including numbers to dial or various parameter values for configuring the operation of the handset. The mobile device 800 may further execute one or more software or firmware applications in response to user commands. These applications may configure the mobile device 800 to perform various customized functions in response to user interaction. Additionally, the mobile device 800 may be programmed and/or configured over-the-air, for example from a wireless base station, a wireless access point, or a peer mobile device 800. The mobile device 800 may execute a web browser application which enables the display 802 to show a web page. The web page may be obtained via wireless communications with a base transceiver station, a wireless network access node, a peer mobile device 800 or any other wireless communication network or system.

Figure 10:
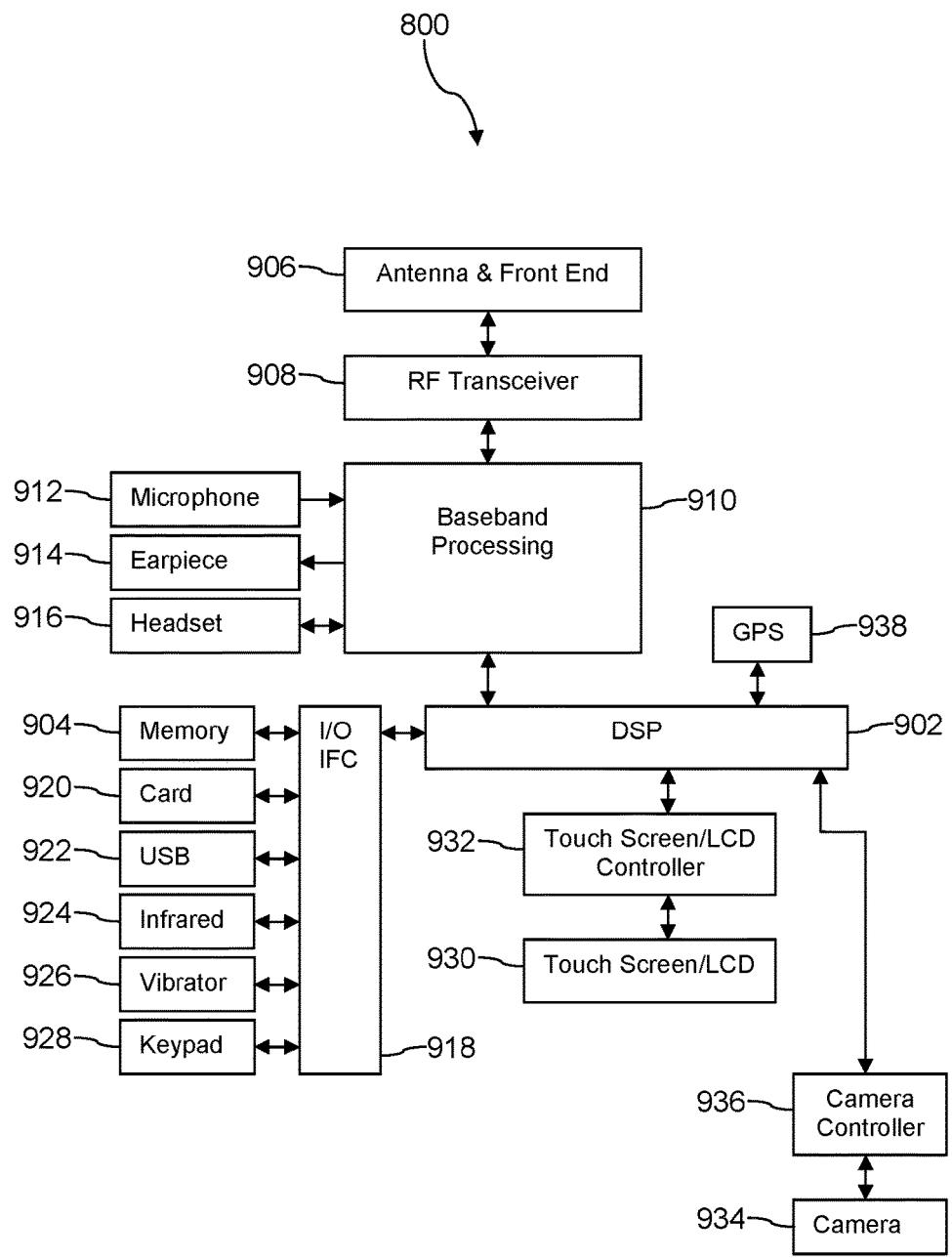
FIG. 10 is a block diagram of a hardware architecture of a handset according to an embodiment of the disclosure.

FIG. 10 shows a block diagram of the mobile device 800. In an embodiment, the UE 102 of FIG. 1 may be a mobile device 800. While a variety of known components of handsets are depicted, in an embodiment a subset of the listed components and/or additional components not listed may be included in the mobile device 800. The mobile device 800 includes a digital signal processor (DSP) 902 and a memory 904. As shown, the mobile device 800 may further include an antenna and front end unit 906, a radio frequency (RF) transceiver 908, a baseband processing unit 910, a microphone 912, an earpiece speaker 914, a headset port 916, an input/output interface 918, a removable memory card 920, a universal serial bus (USB) port 922, an infrared port 924, a vibrator 926, a keypad 928, a touch screen liquid crystal display (LCD) with a touch sensitive surface 930, a touch screen/LCD controller 932, a camera 934, a camera controller 936, and a global positioning system (GPS) receiver 938. In an embodiment, the mobile device 800 may include another kind of display that does not provide a touch sensitive screen. In an embodiment, the DSP 902 may communicate directly with the memory 904 without passing through the input/output interface 918. Additionally, in an embodiment, the mobile device 800 may comprise other peripheral devices that provide other functionality.

The DSP 902 or some other form of controller or central processing unit operates to control the various components of the mobile device 800 in accordance with embedded software or firmware stored in memory 904 or stored in memory contained within the DSP 902 itself. In addition to the embedded software or firmware, the DSP 902 may execute other applications stored in the memory 904 or made available via information carrier media such as portable data storage media like the removable memory card 920 or via wired or wireless network communications. The application software may comprise a compiled set of machine-readable instructions that configure the DSP 902 to provide the desired functionality, or the application software may be high-level software instructions to be processed by an interpreter or compiler to indirectly configure the DSP 902.

The DSP 902 may communicate with a wireless network via the analog baseband processing unit 910. In some embodiments, the communication may provide Internet connectivity, enabling a user to gain access to content on the Internet and to send and receive e-mail or text messages. The input/output interface 918 interconnects the DSP 902 and various memories and interfaces. The memory 904 and the removable memory card 920 may provide software and data to configure the operation of the DSP 902. Among the interfaces may be the USB port 922 and the infrared port 924. The USB port 922 may enable the mobile device 800 to function as a peripheral device to exchange information with a personal computer or other computer system. The infrared port 924 and other optional ports such as a Bluetooth® interface or an IEEE 802.11 compliant wireless interface may enable the mobile device 800 to communicate wirelessly with other nearby handsets and/or wireless base stations.

The keypad 928 couples to the DSP 902 via the interface 918 to provide one mechanism for the user to make selections, enter information, and otherwise provide input to the mobile device 800. Another input mechanism may be the touch screen LCD 930, which may also display text and/or graphics to the user. The touch screen LCD controller 932 couples the DSP 902 to the touch screen LCD 930. The GPS receiver 938 is coupled to the DSP 902 to decode global positioning system signals, thereby enabling the mobile device 800 to determine its position.

Figure 11A:
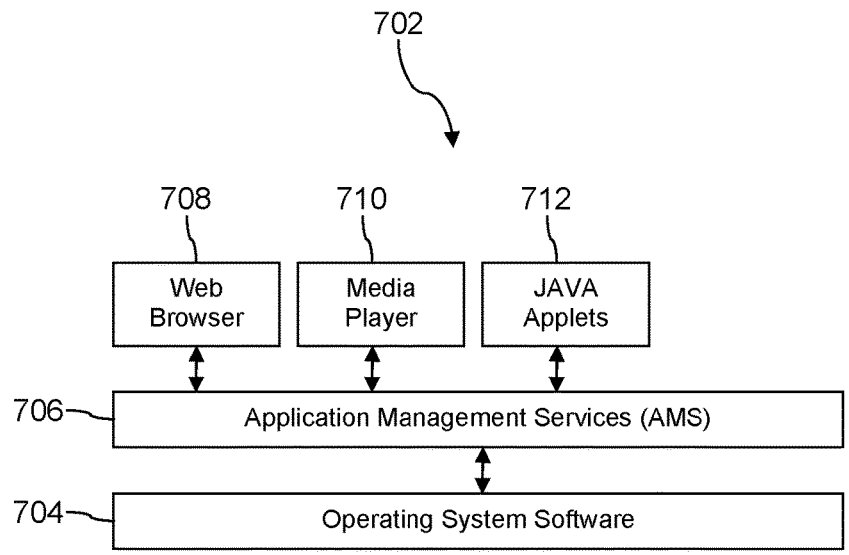
FIG. 11A is block diagram of a software architecture of a handset according to an embodiment of the disclosure.

FIG. 11A illustrates a software environment 702 that may be implemented by the DSP 902. The DSP 902 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services (AMS) 706 that transfer control between applications running on the mobile device 800. Also shown in FIG. 11A are a web browser application 708, a media player application 710, and JAVA applets 712. The web browser application 708 may be executed by the mobile device 800 to browse content and/or the Internet, for example when the mobile device 800 is coupled to a network via a wireless link. The web browser application 708 may permit a user to enter information into forms and select links to retrieve and view web pages. The media player application 710 may be executed by the mobile device 800 to play audio or audiovisual media. The JAVA applets 712 may be executed by the mobile device 800 to provide a variety of functionality including games, utilities, and other functionality.

Figure 11B:
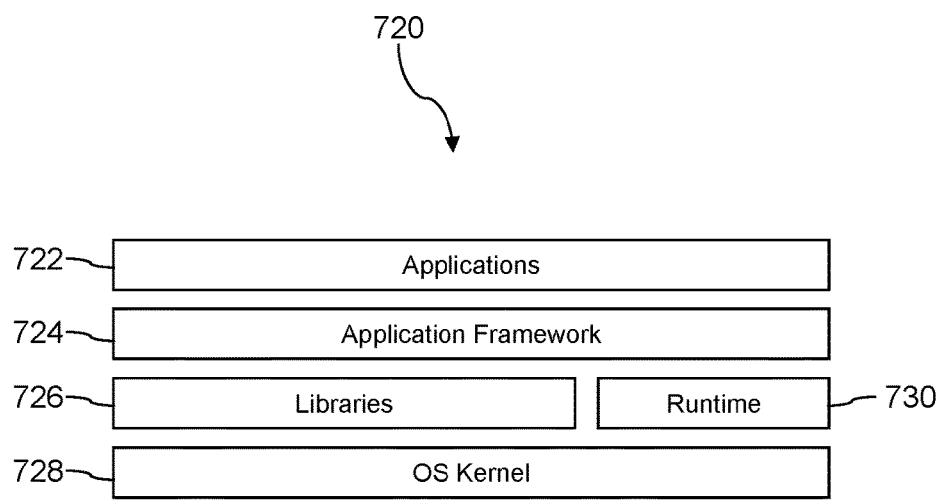
FIG. 11B is a block diagram of another software architecture of a handset according to an embodiment of the disclosure.

FIG. 11B illustrates an alternative software environment 720 that may be implemented by the DSP 902. The DSP 902 executes operating system software 728 (for example an operating system kernel) and an execution runtime 730. The DSP 902 executes applications 722 that may execute in the execution runtime 730 and may rely upon services provided by the application framework 724. Applications 722 and the application framework 724 may rely upon functionality provided via the libraries 726.

Figure 12:
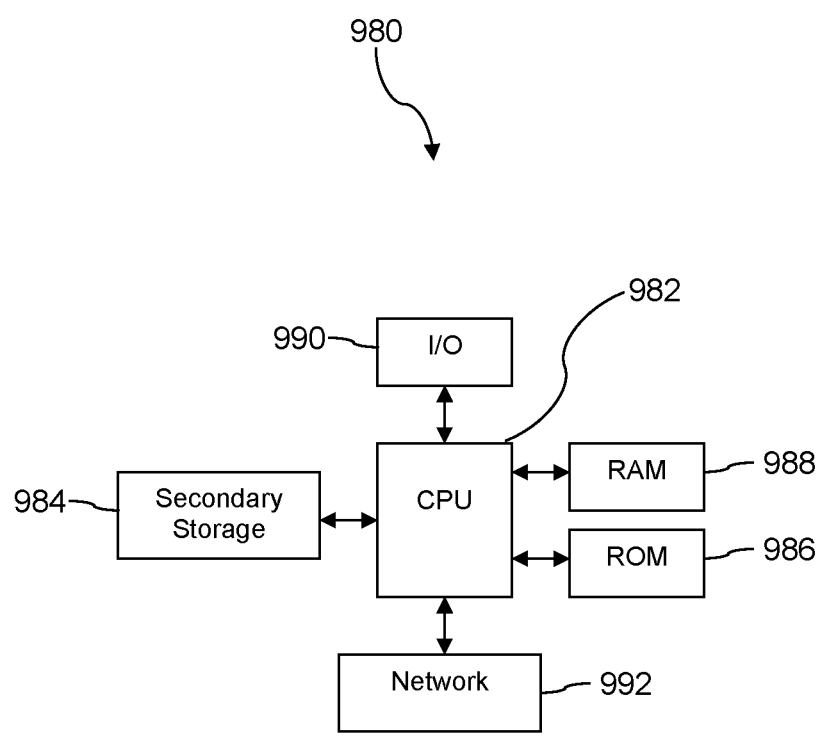
FIG. 12 is a block diagram of a computer system according to an embodiment of the disclosure.

FIG. 12 illustrates a computer system 980 suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor 982 may be implemented as one or more CPU chips.

It is understood that by programming and/or loading executable instructions onto the computer system 980, at least one of the CPU 982, the RAM 988, and the ROM 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984. The secondary storage 984, the RAM 988, and/or the ROM 986 may be referred to in some contexts as computer readable storage media and/or non-transitory computer readable media.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 992 may enable the processor 982 to communicate with the Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the ROM 986, and/or the RAM 988 may be referred to in some contexts as non-transitory instructions and/or non-transitory information.

In an embodiment, the computer system 980 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 980 to provide the functionality of a number of servers that is not directly bound to the number of computers in the computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 980, at least portions of the contents of the computer program product to the secondary storage 984, to the ROM 986, to the RAM 988, and/or to other non-volatile memory and volatile memory of the computer system 980. The processor 982 may process the executable instructions and/or data structures in part by directly accessing the computer program product, for example by reading from a CD-ROM disk inserted into a disk drive peripheral of the computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the ROM 986, to the RAM 988, and/or to other non-volatile memory and volatile memory of the computer system 980.

In some contexts, the secondary storage 984, the ROM 986, and the RAM 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of dynamically adding a communication service function using network function virtualization during a communication session, the method comprising:
    receiving, at a first communication service function executing on a server that comprises a processor, a communication during a communication session on an active connection;
    detecting, by the first communication service function, a communication service trigger in the communication;
    determining a second communication service function based on the communication service trigger;
    determining connection information for the second communication service function;
    providing, by the first communication service function, the connection information to a controller, wherein the controller sets a session routing protocol for a communication flow for the communication session to include the second communication service function;
    routing the communication from the first communication service function to the second communication service function; and
    processing the communication with the second communication service function.

2. The method of claim 1, further comprising:
    receiving, at the server, a setup request for the active connection;
    identifying, by the server, the first communication service function associated with the setup request;
    sending, by the server, a setup message to a network function virtualization catalog, wherein the setup message comprises an identity of the first communication service function;
    receiving, by the server, a setup response from the network function virtualization catalog, wherein the setup response comprises an operating location and routing information for the first communication service function;

providing, by the server, the operating location and the routing information for the first communication service function to the controller, wherein the controller defines the session routing protocol for the active connection to include the first communication service function in the communication flow for the communication session; and performing the communication session using the session routing protocol.

3. The method of claim 1, further comprising:

sending the session routing protocol to a router, wherein the active connection is routed using the session routing protocol during the active connection.

4. The method of claim 3, wherein the session routing protocol for the active connection includes the first communication service function to an output, and wherein routing the communication from the first communication service function to the second communication service function comprises redefining the session routing protocol for the active connection to include the first communication service function to the second communication service function to the output.

5. The method of claim 1, wherein the first communication service function comprises at least one of a voice call function or a data session management function.

6. The method of claim 1, wherein the second communication service function comprises a voicemail function, a video optimization function, a parental control function, a video conferencing function, or a voice conferencing function.

7. The method of claim 1, wherein the communication service trigger comprises a request for the second communication service function.

8. The method of claim 1, wherein the communication service trigger comprises a data request contained within the communication.

9. The method of claim 1, further comprising:

receiving, at the first communication service function, a second communication during the communication session;

detecting, by the first communication service function, a second communication service trigger in the second communication;

determining a third communication service function based on the second communication service trigger;

sending, by the first communication service function, a second message to a network function virtualization catalog, wherein the second message comprises an identity of the third communication service function;

receiving, by the first communication service function, a response from the network function virtualization catalog, wherein the response comprises an operating location and routing information for the third communication service function;

providing, by the first communication service function, the routing information for the third communication service function to the controller, wherein the controller sets the session routing protocol to include the third communication service function in a communication flow for the second communication;

routing the second communication through the first communication service function, the second communication service function, and the third communication service function;

processing the second communication with the third communication service function; and routing the second communication to an output.

10. The method of claim 9, further comprising:

determining a routing order for the second communication service function and the third communication service function; and redefining the session routing protocol to include the routing order.

11. A method of dynamically adding a communication service function to an active connection, the method comprising:

performing a communication session over an active connection, wherein a session routing protocol defines a communication path through a first communication service function executing on a server comprising a processor;

receiving, at the first communication service function, a communication during the communication session;

detecting, by the first communication service function, a communication service trigger in the communication;

determining a second communication service function based on the communication service trigger;

instantiating, by a controller, the second communication service function on a server;

receiving, by the first communication service function, a notification of the instantiation of the second communication service function and routing information for the second communication service function;

providing, by the first communication service function, the routing information for the second communication service function to the controller, wherein the controller defines the session routing protocol to include the second communication service function in a communication flow for the communication session;

routing the communication from the first communication service function to the second communication service function; and processing the communication with the second communication service function.

12. The method of claim 11, further comprising:

sending an identity and the routing information for the second communication service function to a network function virtualization catalog; and storing the identity, an execution location, and the routing information in the network function virtualization catalog.

13. The method of claim 11, further comprising:

creating, in response to receiving a setup request, the session routing protocol; and storing the session routing protocol in a router, wherein the active connection is routed using the session routing protocol during the active connection.

14. The method of claim 11, wherein the first communication service function comprises at least one of a voice call function or a data session management function.

15. The method of claim 11, wherein the second communication service function comprises a voicemail function, a video optimization function, a parental control function, a video conferencing function, or a voice conferencing function.

16. A method of dynamically adding a communication service function to a trusted connection, the method comprising:

receiving, at a first communication service function executing on a server comprising a processor, a communication during a trusted communication session on a trusted connection;

detecting, by the first communication service function, a communication service trigger in the communication;

determining a second communication service function based on the communication service trigger;

determining routing information and an operating location for the second communication service function;

providing, by the first communication service function, the routing information for the second communication service function to a controller, wherein the controller sets a session routing protocol to include the second communication service function in a communication flow for the trusted communication session;

sending the communication from the first communication service function to the second communication service function; and processing the communication with the second communication service function, wherein responsive to the execution of the first communication service function and execution of the second communication service function, all other applications in the operating location are prevented from executing.

17. The method of claim 16, wherein determining the routing information and the operating location for the second communication service function comprises sending a message comprising an identity of the second communication service function and an operating location of the first communication service function to a trusted network function virtualization catalog, wherein the trusted network function virtualization catalog uses a semaphore, wherein the trusted network function virtualization catalog comprises a trusted security zone, and wherein the method further comprises:

accessing the trusted network function virtualization catalog within the trusted security zone, wherein the trusted network function virtualization catalog executes on a second processor;

updating the semaphore based on the accessing;

disabling execution of all applications executing on the second processor outside of the trusted security zone while the trusted network function virtualization catalog executes within the trusted security zone;

closing the trusted network function virtualization catalog; and releasing the trusted network function virtualization catalog in the semaphore.

18. The method of claim 16, wherein an end-to-end trusted connection is established between the server, the controller, and a user equipment.

19. The method of claim 16, wherein the server comprises a trusted security zone, wherein the first communication service function and the second communication service function execute within the trusted security zone, wherein all applications outside of the trusted security zone are disabled while the first communication service function and the second communication service function execute within the trusted security zone.

20. The method of claim 16, wherein a trusted network function virtualization catalog comprises a list of executing trusted applications, an execution location of the executing trusted applications, and routing information for each executing trusted application.

* * * * *